US012023766B2

(12) United States Patent
McPhee

(10) Patent No.: US 12,023,766 B2
(45) Date of Patent: Jul. 2, 2024

(54) HYDRAULIC TENSIONING AND RELEASE TOOL FOR EXPANSION FASTENERS

(71) Applicant: NORD-LOCK SWITZERLAND GMBH, St. Gallenkappel (CH)

(72) Inventor: Andrew Duncan McPhee, Brisbane (AU)

(73) Assignee: NORD-LOCK SWITZERLAND GMBH, St. Gallenkappel (CH)

( * ) Notice: Subject to any disclaimer, the term of this patent is extended or adjusted under 35 U.S.C. 154(b) by 413 days.

(21) Appl. No.: 17/285,531

(22) PCT Filed: Oct. 15, 2019

(86) PCT No.: PCT/AU2019/051116
§ 371 (c)(1),
(2) Date: Apr. 15, 2021

(87) PCT Pub. No.: WO2020/077396
PCT Pub. Date: Apr. 23, 2020

(65) Prior Publication Data
US 2021/0387298 A1 Dec. 16, 2021

(30) Foreign Application Priority Data
Oct. 15, 2018 (AU) ................................ 2018903896

(51) Int. Cl.
*B23P 19/06* (2006.01)
*B25B 29/02* (2006.01)
(Continued)

(52) U.S. Cl.
CPC ............ *B23P 19/067* (2013.01); *B25B 29/02* (2013.01); *F16B 5/0258* (2013.01); *F16B 31/043* (2013.01)

(58) Field of Classification Search
CPC ...... F16B 31/043; F16B 5/0285; F16B 4/002; F16B 2/04; B25B 29/02; B23P 19/067
(Continued)

(56) References Cited

U.S. PATENT DOCUMENTS 3,008,362 A * 11/1961 Tucker, Jr. .............. B25B 29/02
92/151
3,995,828 A * 12/1976 Orban ..................... B25B 29/02
376/262
(Continued)

FOREIGN PATENT DOCUMENTS

BE 904442 A 7/1986
EP 0824202 A2 2/1998
(Continued)

OTHER PUBLICATIONS

Superbolt, "The Solution to Bolting Problems," Catalog, Jul. 1, 2004, pp. 1-28, XP055181019, retrieved from http://spitzer-assoc.com/superboltcatalog.pdf on Apr. 2, 2015.
(Continued)

*Primary Examiner* — Flemming Saether
(74) *Attorney, Agent, or Firm* — Workman Nydegger

(57) ABSTRACT

A hydraulic tensioning and release tool for an expansion fastener of a type having an elongate member with a tapered portion for fastening a workpiece. The tool includes a sleeve for placement about the tapered portion; a cylinder(s) including a cylinder for generating compressive force against the workpiece; a release piston for displacing the sleeve and a tension piston for coupling to elongate member. The tension piston and the cylinder(s) defining a tension chamber and the release piston. One of cylinder(s) defines at least one release chamber. Hydraulic ports are in fluid communication with the tension chamber and the release chamber for application of hydraulic pressure to displace the tension piston and the release piston for respectively ten-
(Continued)

sioning the elongate member and for releasing the sleeve from the tapered portion. A tension retaining arrangement retains the elongate member in tension subsequent to removal of hydraulic pressure from the tensioning chamber.

22 Claims, 24 Drawing Sheets

(51) Int. Cl.
*F16B 5/02* (2006.01)
*F16B 31/04* (2006.01)

(58) Field of Classification Search
USPC .................................. 411/14.5, 915–917
See application file for complete search history.

(56) References Cited

U.S. PATENT DOCUMENTS

| | | | | |
|---|---|---|---|---|
| 4,192,621 A | * | 3/1980 | Barth | F16D 1/033 |
| | | | | 29/523 |
| 4,304,502 A | * | 12/1981 | Stratienko | F16D 1/094 |
| | | | | 403/370 |
| 4,326,826 A | * | 4/1982 | Bunyan | F16B 5/02 |
| | | | | 411/432 |
| 4,708,036 A | * | 11/1987 | Vossbrinck | B25B 29/02 |
| | | | | 81/57.38 |
| 4,809,952 A | * | 3/1989 | Joubert | E21B 43/013 |
| | | | | 29/452 |
| 5,025,541 A | | 6/1991 | Frizot | |
| 5,029,461 A | * | 7/1991 | Lawrence | F16B 31/043 |
| | | | | 492/1 |
| 8,266,781 B2 | * | 9/2012 | Bucknell | B23P 19/067 |
| | | | | 411/917 |
| 8,496,394 B2 | * | 7/2013 | Schneider | F16B 5/02 |
| | | | | 403/337 |
| 10,962,040 B2 | * | 3/2021 | Rosén | F16B 19/02 |
| 11,415,158 B2 | * | 8/2022 | Schneider | F16B 3/06 |

FOREIGN PATENT DOCUMENTS

| | | |
|---|---|---|
| EP | 3193011 A1 | 7/2017 |
| GB | 1544540 | 4/1979 |
| GB | 2266357 A | 4/1992 |
| NO | 2007043143 A1 | 4/2007 |
| WO | 03067103 A1 | 8/2003 |
| WO | 2010052483 A1 | 5/2010 |

OTHER PUBLICATIONS

Extended European Search Report from corresponding European Application No. 19872735.6, Jun. 27, 2022.
International Search Report and Written Opinion from PCT Application No. PCT/AU2019/051116, Jan. 6, 2020.

* cited by examiner

HYDRAULIC TENSIONING AND RELEASE TOOL FOR EXPANSION FASTENERS

The present disclosure generally relates to expansion bolts and to apparatus for tensioning and removal of expansion bolts.

RELATED APPLICATIONS

The present application claims priority from Australian provisional patent application No. 2018903896 filed 15 Oct. 2018, the disclosure of which is hereby incorporated in its entirety by reference.

BACKGROUND

Any references to methods, apparatus or documents of the prior art are not to be taken as constituting any evidence or admission that they formed, or form part of the common general knowledge.

It is common practice in many situations to interconnect rotatable shafts, in order to transfer torque from one shaft to another, with flange couplings. Flange couplings are often used to transmit large torques and require tight or interference fit bolting elements which are expensive to manufacture and place high demands on the tolerances and surface finishes of the bores through the flanges. Even after machining or honing the bores, further positional adjustments are often required during assembly. Furthermore, once a conventional bolt is stretched its diameter reduces so that it may no longer fits snugly within the bore.

Expansion bolt assemblies are known in the prior art. For example, one type of prior art expansion bolt assembly is marketed by Superbolt Inc. and is particularly useful in the area of critical flange coupling. An exemplary prior art Superbolt Inc. expansion bolt assembly 1 is depicted in FIG. 1 in exploded view and in FIG. 2 in use fastening two flanges 33 and 35 together. The expansion bolt assembly 1 includes an elongate stud 3 which has first and second threaded end portions 7 and 9. Between the first and second threaded end portions 7 and 9 there is an intermediate tapered portion 11. The tapered portion 11 has a second end 12 with a diameter L2 and a first end 14 which has a diameter L1, wherein L1 is less than L2. Accordingly, the shape of the intermediate tapered portion 11 is frusto-conical. A split tapered sleeve 5 is provided that is about the same axial length as the intermediate tapered portion 11. The split tapered sleeve 5 has a cylindrical outer wall and an internal wall with a tapering profile that complements that of the outside of the intermediate tapered portion 11. The split tapered sleeve 5 has a second end 18 and a first end 16 with a longitudinal split 8 therebetween. The split tapered sleeve 5 is slid over the intermediate tapered portion 11 so that in a resting configuration the second end 18 of the sleeve 5 approaches the second end 12 of the intermediate tapered portion 11 of the stud 3. Forcing the split sleeve 5 further along the intermediate tapered portion toward the second end 12 will cause the sleeve 5 to radially expand. A cylindrical spacer 17 is located about the stud 3. The cylindrical spacer 17 is placed in the bore of the flange 33. The cylindrical spacer 17 has a second end 22 and a first end 20. The second end 22 is pushed into abutment with the first end 16 of the split sleeve 5.

A first hardened washer 25 is placed over the first threaded portion 7 of the stud 3 and abuts the first end 20 of the cylindrical spacer 17. A first capture arrangement in the form of a first multi jack tensioner (MJT) 27 is threaded onto the first threaded portion 7 of the stud 3. In use points of jack bolts 32 of the MJT 27 are forced against the hardened washer 25 to thereby force the washer, and thence the cylindrical spacer 17 to force the split sleeve 5 along the intermediate tapered portion 11 of the stud 3 thereby causing the split sleeve 5 to radially expand.

The second threaded portion 9 of the stud 3 extends through the bore of the second flange 35. A second hardened washer 29 locates over the second threaded portion on the outside of second flange 35 and a second capture arrangement in the form of MJT 31 is hand tightened onto the second threaded portion 9 of the stud 3. It will be realized that expansion bolts can make use of fasteners other than MJTs. For example, standard bolts and washers can be used instead of MJTs however MJTs are preferable because they distribute the tightening tension around the plurality of jackbolts in each MJT, for example eight jackbolts, so that they can be tightened, and also released, more safely and more evenly than a standard bolt.

As best seen in FIG. 2, in use the tapered sleeve 5 is slid along the intermediate tapered portion 11 of the stud 3. The first threaded portion 7 of the stud 3 is then inserted through the bores of first and second flanges 33 and 35. The cylindrical spacer 17 is placed over the first threaded portion 7 and slid into the bore of flange 33 so that it abuts the sleeve 5. The first and second washers 25, 29 are placed over the first and second threaded portions 7, 9 of stud 3 with the first washer 25 abutting the first end 20 of cylindrical spacer 17 and the flange 33. The second washer 29 abuts the flange 35. The first and second MJTs 27, 31 are hand screwed onto the first and second threaded ends 7, 9 of stud 3 until they bear against the first and second washers 25, 29. Jack bolts 32 of the first and second MJTs are then progressively tightened in a pattern that evenly distributes force onto the washers 25, 29. As the jackbolts of the first MJT 27 are torqued the MJT 27 tensions the tapered stud 3 so that the intermediate tapered portion 11 is pulled into the split sleeve 5, which is held stationary against the first washer 25 via spacer 17, thereby radially expanding split sleeve 5 so that it generates an outward radial force, indicated by arrows 37, against the internal walls of the bores of the flanges 33, 35 which is opposed by an equal inward radial force from the flanges represented by arrows 39. At the same time, the second MJT 31 cooperates with first MJT 27 to tension the stud 3, indicated by arrow 41, to thereby generate opposed axial clamping forces indicated by arrows 43, 45, in the flanges so compressing the flanges 33 and 35 together. Consequently, once suitably tensioned, and with the sleeve 5 radially expanded, the tapered stud 3 transfers forces required for radial and axial frictional contacts with the flanges to thereby securely fasten the flanges 33, 35 together.

The expansion fastener 1 that has been described has been found to work well and to provide a safe and effective means for coupling flanges together such as may be used for transferring torques in heavy machinery such as steam turbines. Other variations of the expansion fastener are also known, for example versions where the stud 3 is for use in a blind hole do not have a second threaded portion but rather rely upon friction between the expanded sleeve and the bore holding the stud sufficiently firmly for tension to be applied by a single MJT and washer on the first threaded end 7.

One problem that has been found to occur with expansion bolts is that it may be difficult to remove them when desired, for example when it is necessary to dissemble the two flanges from each other. A reason for this difficulty is that the radial force that is applied by the split sleeve 5 to the inside walls of the bores of the flanges may cause an interference fit between the sleeve 5, stud 3 and the bores of the flanges 33, 35 that can only be overcome using specialized techniques such as torch cutting or applying high pressure oil in an attempt to "float off" the bolt assembly.

It is an object of the present disclosure to address at least one of the above described problems.

SUMMARY

According to a first aspect of the present invention there is provided a hydraulic tensioning and release tool for an expansion fastener of a type having an elongate member with a tapered portion for fastening a workpiece, said tool comprising:
    a sleeve for placement about the tapered portion;
    one or more cylinders including at least one cylinder for generating compressive force against the workpiece;
    a release piston for displacing the sleeve and a tension piston for coupling to an end of the elongate member, the tension piston and at least one of the one or more cylinders defining at least one tension chamber and the release piston and at least one of the one or more cylinders defining at least one release chamber;
    hydraulic ports in fluid communication with said tension chamber and said release chamber for application of hydraulic pressure thereto to displace the tension piston and the release piston for respectively tensioning the elongate member and for releasing the sleeve from the tapered portion; and
    a tension retaining arrangement for retaining the end of the elongate member in tension subsequent to removal of hydraulic pressure from the tensioning chamber.

In an embodiment the tension piston includes a passage for an end of said elongate member.

In an embodiment the tension piston is configured to be directly coupled to the end of the elongate member.

In an embodiment tension piston is configured to be threaded onto the end of the elongate member.

In an embodiment the tension piston is configured to be coupled to the end of the elongate member via an intermediate member.

In an embodiment the intermediate member comprises a nut that is threaded on the end of the elongate member wherein the piston is threadedly fastened to the nut.

In an embodiment the nut includes inner and outer coaxial walls defining a coaxial trough therebetween for receiving a lower end of an annular tension piston rod of the tension piston.

In an embodiment an inner side of the inner wall is threaded for engaging a corresponding thread of the end of the elongate member.

In an embodiment an outer side of the inner coaxial wall is threaded for engaging a correspondingly threaded portion of an inner wall of the annular tension piston.

In an embodiment wherein the tension retaining arrangement comprises a locking ring.

In an embodiment an outer side of the outer wall of the nut is threaded for engaging a corresponding thread of an inner side of the locking ring.

In an embodiment the tension piston includes first and second tension piston heads.

In an embodiment the one or more cylinders include first and second tension cylinders respectively receiving the first and second tension piston heads.

In an embodiment the first and second tension piston heads are axially displaced and in series.

In an embodiment the first and second tension piston heads radially extend about the annular tension piston rod.

In an embodiment the first tension piston head is threadedly engaged with the annular tension piston rod.

In an embodiment the second tension piston head is integrally formed with the annular tension piston rod.

In an embodiment the hydraulic ports include a port through the first piston head and a port through the second tension cylinder.

In an embodiment the release piston includes an annular piston head located about the first annular piston rod.

In an embodiment the tool includes a second annular piston rod for coupling to the sleeve.

In an embodiment the release piston is integrally formed with the sleeve.

In an embodiment the one or more hydraulic cylinders includes a release cylinder for applying compressive force to the workpiece.

In an embodiment the tool includes a bridge between the workpiece and the at least one cylinder for conveying the compressive force against workpiece.

In an embodiment the release cylinder is located within the bridge.

In an embodiment the bridge includes a worm drive which meshes with teeth of an outer side of the locking ring for rotation thereof.

In an embodiment the locking ring is disposed axially adjacent the release cylinder.

In another aspect the tool that has been described may be provided in combination with an expansion fastener comprising an elongate member with a tapered portion and a sleeve thereabout.

According to another aspect there is provided a hydraulic tensioning tool for tensioning an elongate member including:
    a locking ring for maintaining the elongate member under tension, the locking ring having a toothed outer wall; and
    a drive assembly including a rotary drive member meshed with the toothed outer wall for rotation thereof.

In an embodiment the rotary drive member comprises a worm.

In a further aspect there is provided an expansion fastener for fastening a workpiece including:
    a piston coupled to an expansion sleeve of said fastener; and
    a cylinder seating the piston to define a hydraulic chamber therebetween and locatable for movement of the piston and the workpiece relative to each other;
    wherein application of hydraulic pressure to the hydraulic chamber forces the piston and thence the expansion sleeve away from a tapered portion of the expansion fastener in use.

In another aspect there is provided a method for tensioning an expansion fastener of a type having an elongate member with a tapered portion and a sleeve thereabout for fastening a workpiece, said method comprising:
    locating the tapered portion with the sleeve thereabout through the workpiece;
    capturing a first end of the elongate member on a first side of the workpiece with a first capture arrangement, for example a MJT;
    capturing a second end of the elongate member on a second side of the workpiece with a second capture arrangement, for example a nut;
    removably fastening a hydraulic tensioning assembly to the second capture arrangement;

operating the hydraulic tensioning assembly to stretch the elongate member;
applying a tension retaining member to the second capture arrangement; and
removing the hydraulic tensioning assembly from the second capture arrangement thereby leaving the elongate member under tension.

In an embodiment the method includes:
removing the tension retaining member from the second capture arrangement to thereby remove the elongate member from tension;
applying hydraulic pressure between the sleeve and the workpiece to thereby release the sleeve from the tapered portion of the elongate member.

In a further aspect there is provided an expansion bolt assembly comprising:
an elongate member with a tapered portion and a sleeve thereabout for fastening a workpiece,
one or more cylinders including at least one cylinder for generating compressive force against the workpiece;
a release piston for displacing the sleeve and a tension piston for coupling to an end of the elongate member, the tension piston and at least one of the one or more cylinders defining at least one tension chamber and the release piston and at least one of the one or more cylinders defining at least one release chamber;
hydraulic ports in fluid communication with said tension chamber and said release chamber for application of hydraulic pressure thereto to displace the tension piston and the release piston for respectively tensioning the elongate member and for releasing the sleeve from the tapered portion; and
a tension retaining arrangement for retaining the end of the elongate member in tension subsequent to removal of hydraulic pressure from the tensioning chamber.

DESCRIPTION OF FIGURES

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The embodiments described herein may be better understood by reference to the accompanying figures, in which.

DETAILED DESCRIPTION

Figure 1:
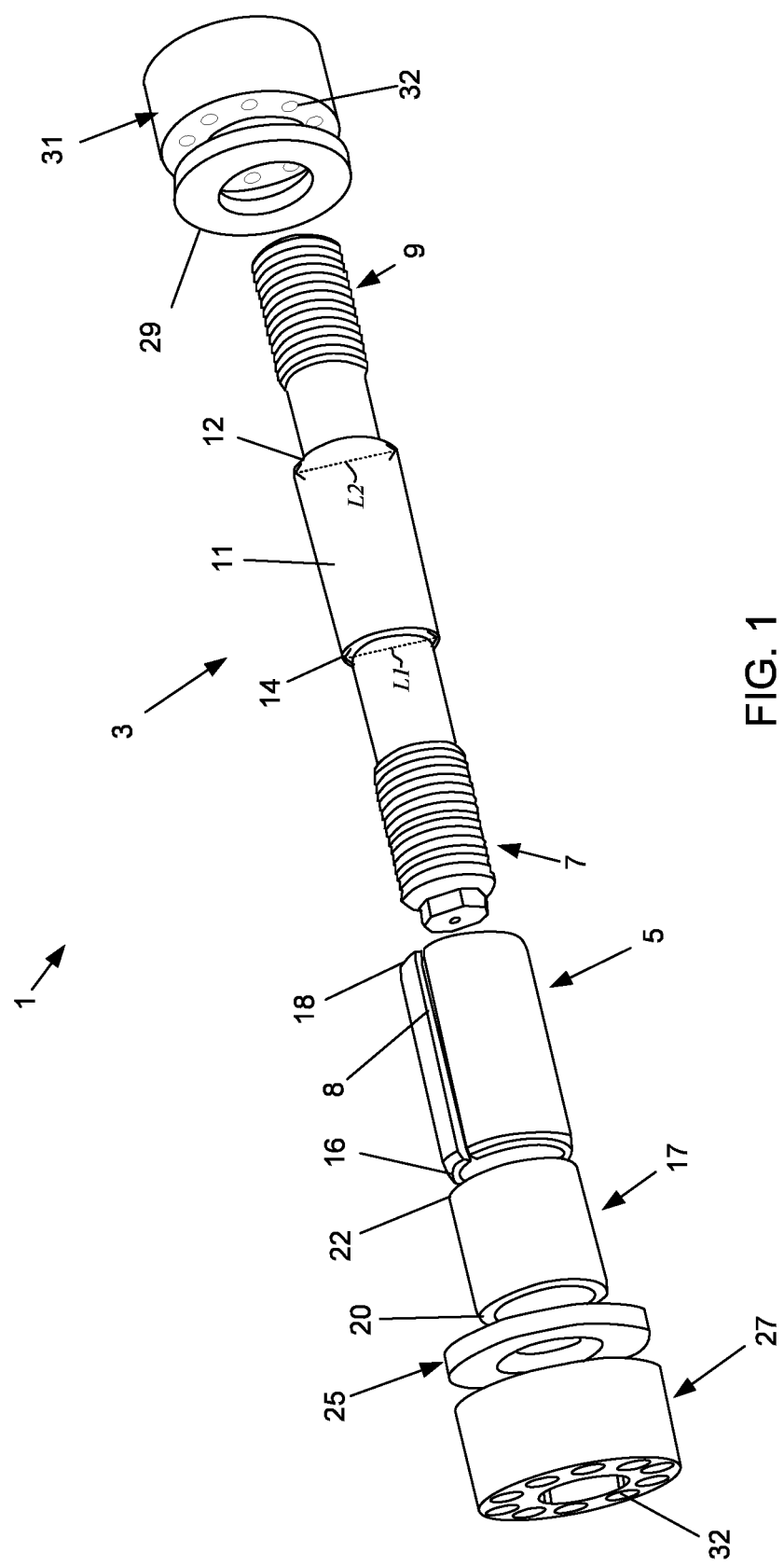
FIG. 1 depicts a prior art expansion fastener assembly in exploded view.
Figure 2:
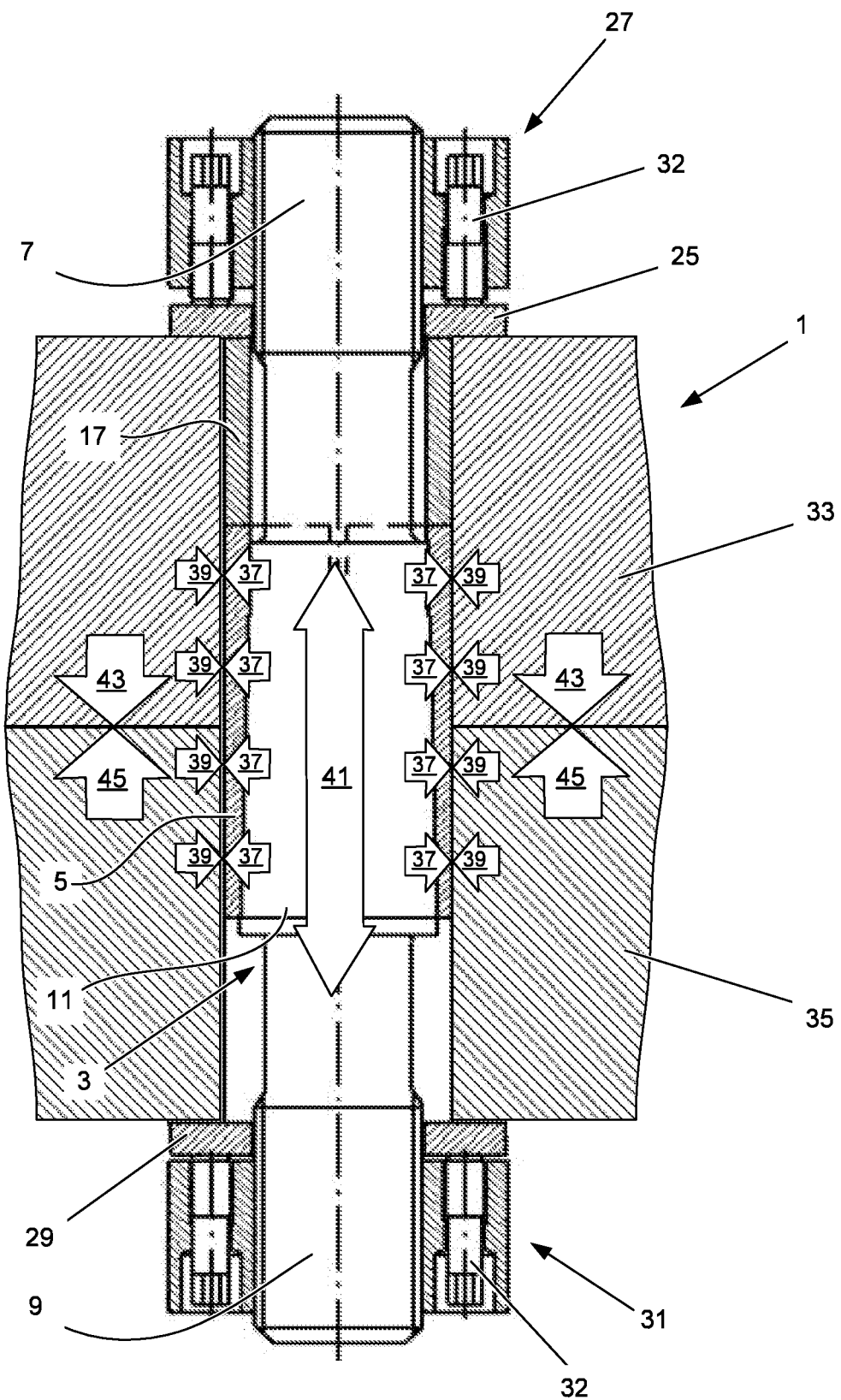
FIG. 2 is a cross sectional view of the fastener assembly of FIG. 1 in use.
Figure 3:
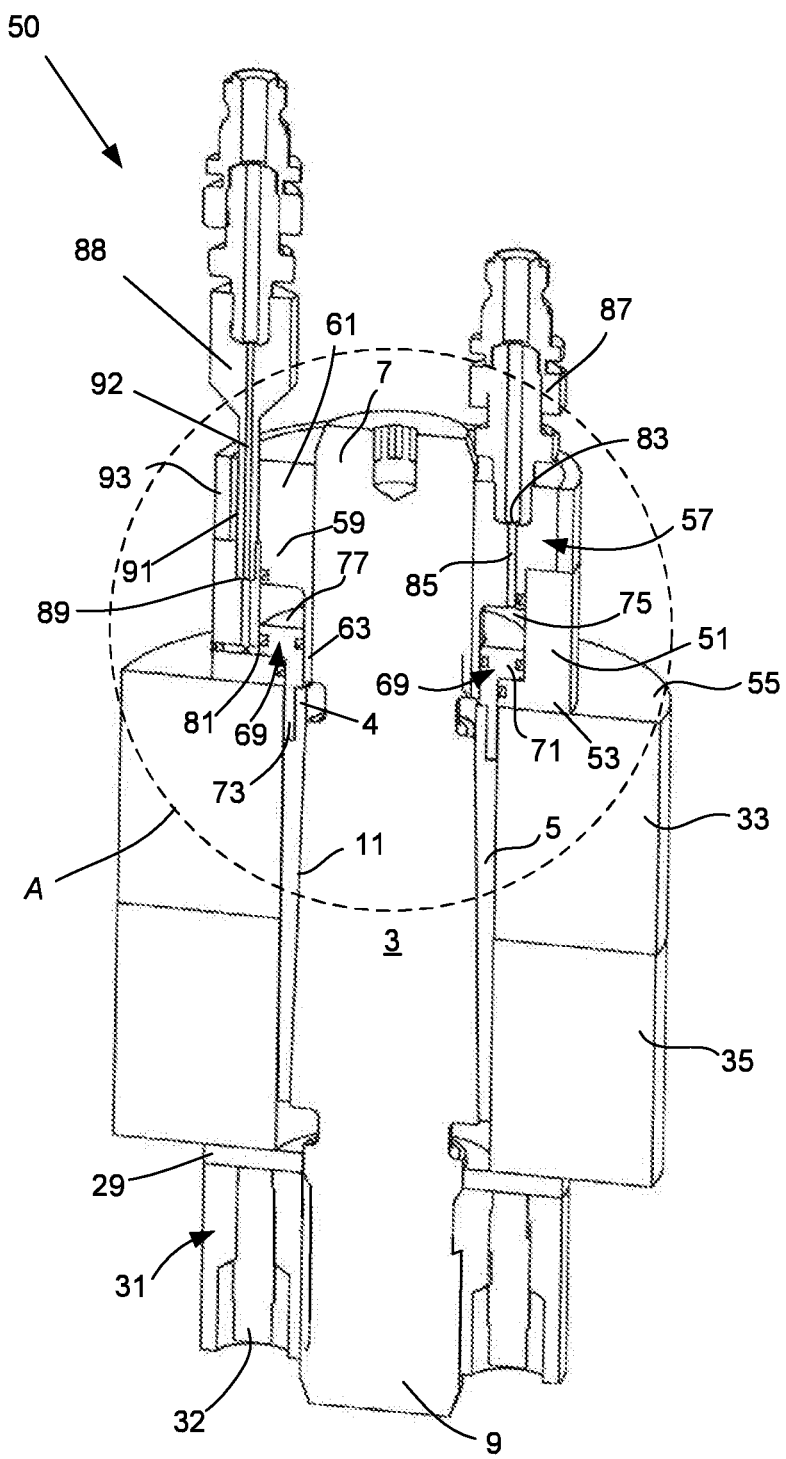
FIG. 3 is a longitudinal cross-sectional view of a hydraulic tensioning and release tool according to a first embodiment of the present invention in use attached to an expansion fastener.

FIG. 3 depicts a hydraulic tensioning and release tool 50 according to a first embodiment. The hydraulic tool 50 is shown in use applied to an expansion fastener comprising an elongate member in the form of stud 3 with a tapered portion 11 about which a sleeve 5 of the tool 50 is located and with hydraulic connectors 88 and 87 attached.

The hydraulic tool 50 is threaded, by a central axial threaded bore 62 of tension piston 57, onto the upper end 7 of the stud 3. The stud 3 is shown inserted through bores of adjacent workpieces in the form of flanges 33 and 35 with the sleeve 5 located around the tapered portion 11 of stud 3. A lower threaded end 9 of stud 3 extends out through the bottom of flange 35 and is captured by washer 29 and MJT 31.

The hydraulic tensioning and release tool 50 is comprised of a hydraulic cylinder 51, a base 53 of which is seated against an outer side 55 of flange 33 for imparting compressive force thereto in use. A tension piston 57 is provided that has a stepped portion 59 that is received in hydraulic cylinder 51 so that the tension piston 57 is axially displaceable along the hydraulic cylinder 51. The tension piston 57 includes an annular tension piston head 61 which includes a central axial threaded bore 62 so that it acts as a nut into which the upper threaded end 7 of the stud 3 is threadedly engaged.

The tension piston 57 also includes a first annular tension piston rod 63 which extends coaxially from the tension piston head 61 and which provides a passage for the upper end 7 of stud 3 to pass through for threaded connection to the tension piston head 61.

The hydraulic tool 50 also includes a release piston 69 that is displaceable along the cylinder 51. The release piston 69 includes an annular release piston head 71 that locates about the annular tension piston rod 63 and also an annular release piston rod 73 that is coaxial with the release piston head 71. The lower end of the annular release piston rod 73 is formed with a thread for making a threaded attachment to a complementary threaded portion 4 of sleeve 5.

A tension hydraulic chamber 75 is formed between the cylinder 51, the tension piston 57 and a top side 77 of the annular piston head 71 of the release piston 69.

A release hydraulic chamber 79 (best seen in FIG. 6) is formed between the cylinder 51 and the underside 81 of the annular release piston head 71.

The tension hydraulic chamber 75 is in fluid communication with a first hydraulic fluid inlet port 83 located on an upper end of the tension piston 57 via a fluid bore 85 that extends through the tension piston 57. A hose adapter 87 is shown in FIG. 3 for coupling a source of hydraulic pressure to the first fluid inlet port 83 in order to pressurize the first hydraulic chamber in the form of tension hydraulic chamber 75.

The second hydraulic chamber in the form of release hydraulic chamber 79 is in fluid communication with a second hydraulic fluid inlet port 89 that is formed on an upper end of the cylinder 51. A bore 91 is formed through the outer end of the tension piston 57 for passage of a fluid conduit 92 therethrough to the second port 89 that is accessible from the outer end of the tension piston 57. The fluid conduit extends through the cylinder 51. A hose adapter 88 is located at the remote end of the fluid conduit 92. A threaded plug 82 is provided to seal off a lateral outlet made during machining of the fluid conduit 92.

Application of hydraulic pressure to the tension hydraulic chamber 75 urges the tension piston 57 and the release piston 69 apart thereby causing relative movement between the stud 3 and the sleeve 5 for radial expansion of the sleeve 5 and for applying axial tension along the stud. Conversely application of hydraulic pressure to the release hydraulic chamber 79 urges the release piston 69 toward the tension piston head 61 for disengaging the sleeve 5 from the tapered elongate member, i.e. the tapered portion 11 of stud 3.

Figure 4:
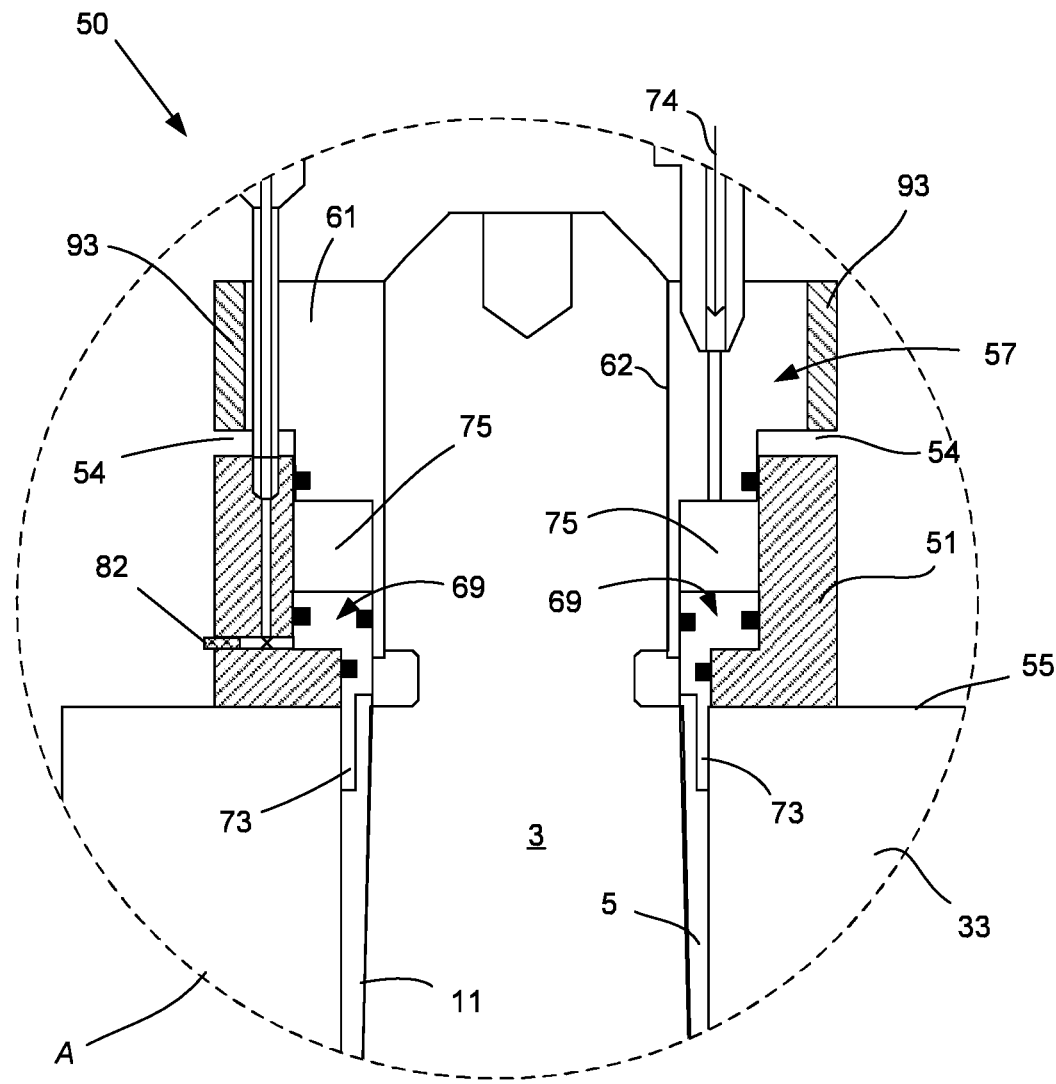
FIG. 4 is a plan cross sectional view of detail A of FIG. 3 showing a first piston raised from a cylinder of the tool in response to application of hydraulic pressure to a first chamber.

As illustrated in FIG. 4, in use hydraulic pressure, indicated by arrow 74, is applied to the first hydraulic chamber 75 so that the cylinder 51 will bear down on the upper surface 55 of flange 33 and the tension piston 57 will be displaced upwardly from cylinder 51 so that the stud 3, which is captured at its bottom end by the MJT 32, will be stretched under tension. Consequently, a gap 54 will arise between the upper surface of the cylinder 51 and the tension piston head 61. In order that the tension in the stud 3 can be retained after the hydraulic pressure to chamber 75 is removed a retaining arrangement is provided to maintain the gap 54 between the tension piston head 61 and the cylinder 51.

Figure 5:
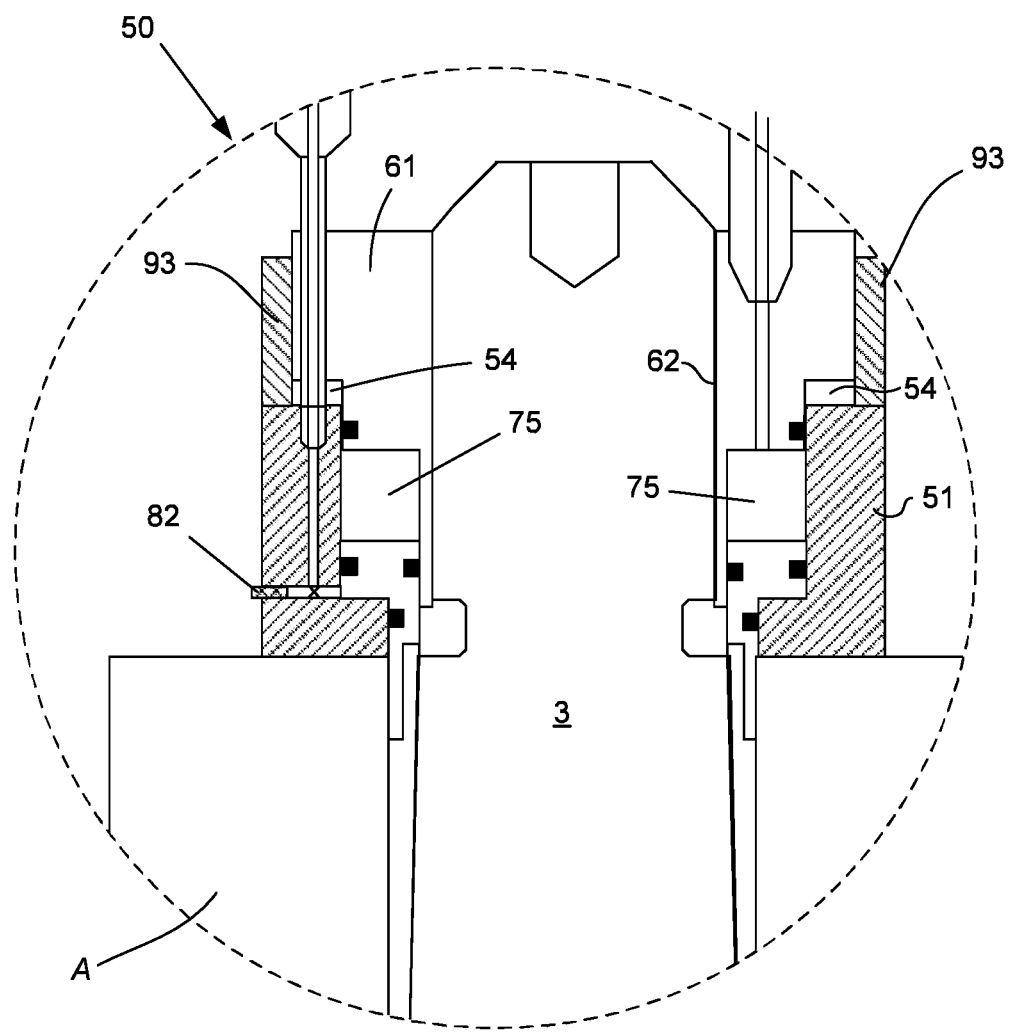
FIG. 5 shows a locking ring screwed down to maintain spacing between the first piston and the cylinder of the tool to thereby maintain tension in a stud of the expansion fastener after removal of the hydraulic pressure to the first chamber.

In the presently described example, the retaining arrangement comprises a locking ring 93 that is threaded about the outside of the first piston head, which is the tension piston head 61, above the cylinder 51. Consequently, upon hydraulically displacing the tension piston 57 from the cylinder 51 to produce gap 54 the locking ring 93 may then be rotated so that it screws down to seat against the cylinder 51 as shown in FIG. 5 to thereby retain the tension piston 57 in place and thus the stud 3 under tension and stretched with the sleeve 5 imparting radial force against the bore. Hydraulic pressure can then be disconnected from the first hydraulic chamber 75. It will be realized that other retaining arrangements could be provided such as one or more shims or jack bolts for location between the first piston head 57 and the cylinder 51.

Figure 6:
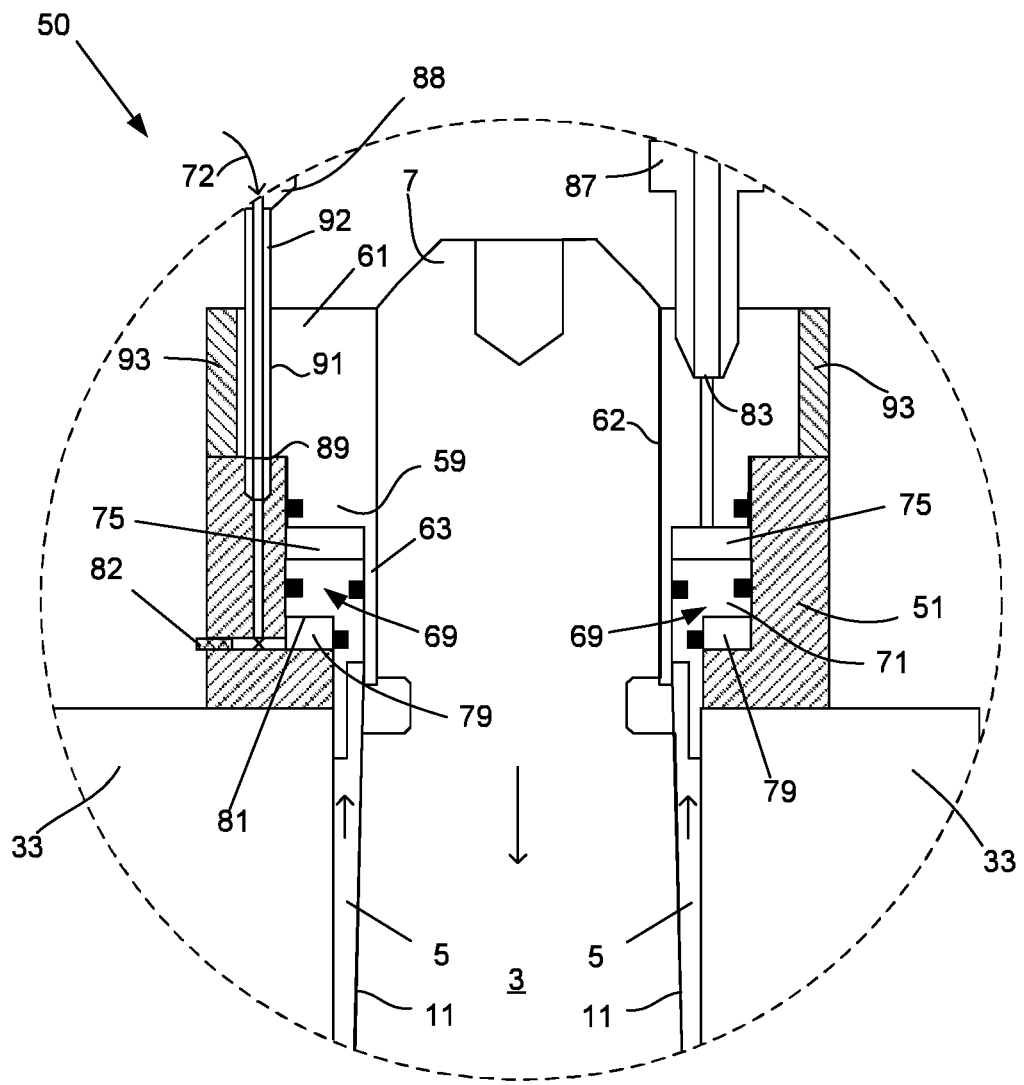
FIG. 6 shows application of hydraulic pressure to a second chamber to thereby raise a second piston of the tool for disengaging a sleeve of the expansion fastener.

In order to release the sleeve 5 and stud 3 from the bores of flanges 33, 35, hydraulic pressure, indicated by arrow 74 (in FIG. 4), is again applied to tension chamber 75 further tensioning the tensioned stud of FIG. 4 so that the locking ring 93 can be backed off from the cylinder 51 in order that locking ring 93 can then be unscrewed to the position shown in FIG. 4. The hydraulic pressure 74 is then removed. Hydraulic pressure, indicated by arrow 72 in FIG. 6, is applied to release chamber 79. Application of the hydraulic pressure to the release chamber 79 causes the release piston 69 to travel away from flange 33 thereby pulling the sleeve 5 out of engagement with the tapered portion 11 of stud 3 so that sleeve 5 decreases in radial diameter and the radial force exerted against the bores of the flanges 33 and 35 is removed so that it is then possible to remove the stud 3 and the sleeve 5 from the bores of the flanges 33, 35.

Figure 7:
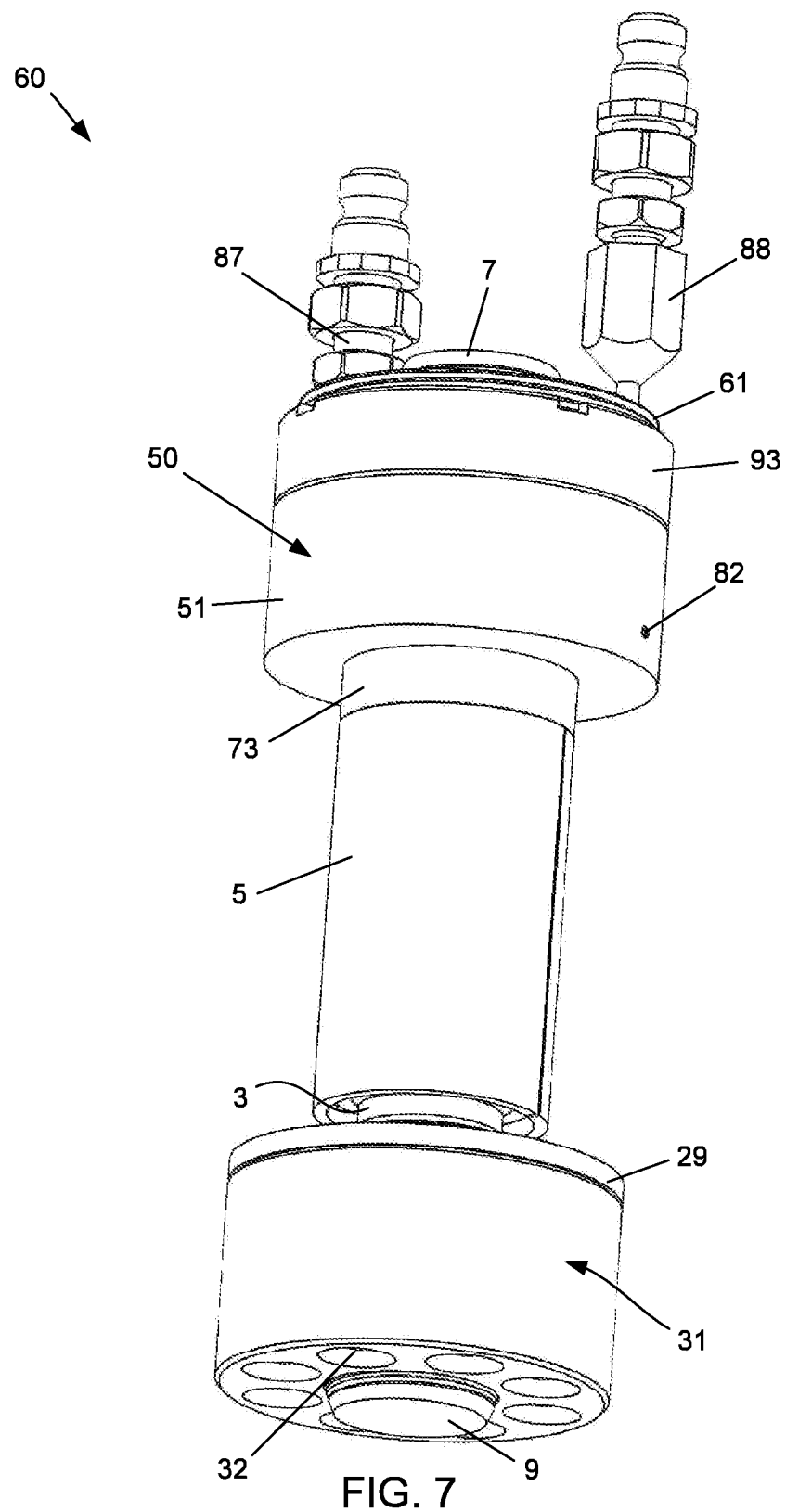
FIG. 7 illustrates the hydraulic tensioning and release tool with hydraulic couplers fitted and in combination with an expansion fastener.
Figure 8:
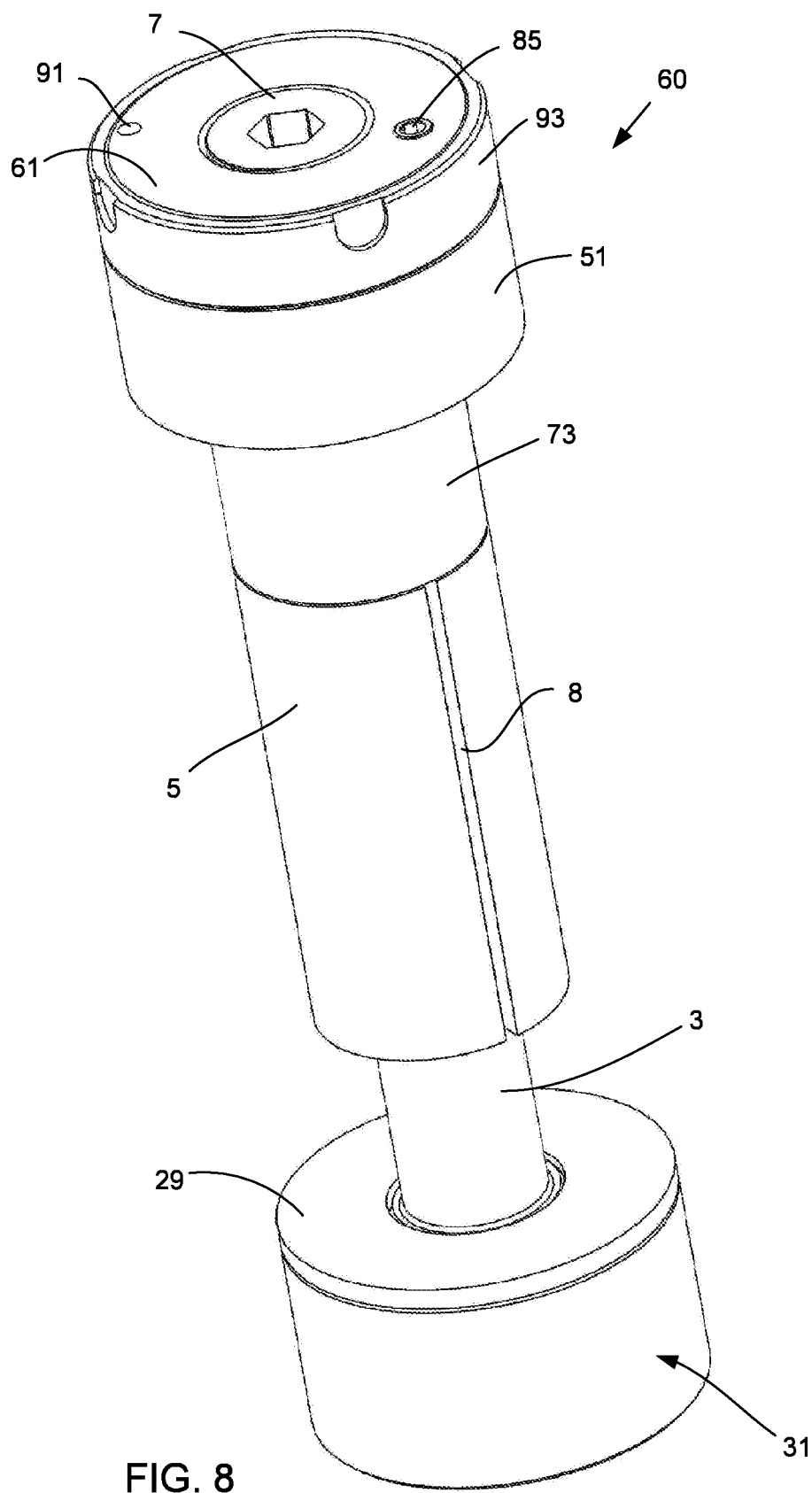
FIG. 8 is a further view of the combination of FIG. 7 with hydraulic couplers removed.

FIG. 7 illustrates an expansion fastener assembly 60 that includes the hydraulic tensioning and release tool 50 with hydraulic couplers 87 and 88 attached prior to use. FIG. 8 is a further view of the expansion fastener assembly 60 with the hydraulic couplers 87 and 88 removed and thus in a state for shipping to end users.

A further and preferred embodiment of the invention and a method for its use will now be described with reference to FIG. 9 onwards.

Figure 9:
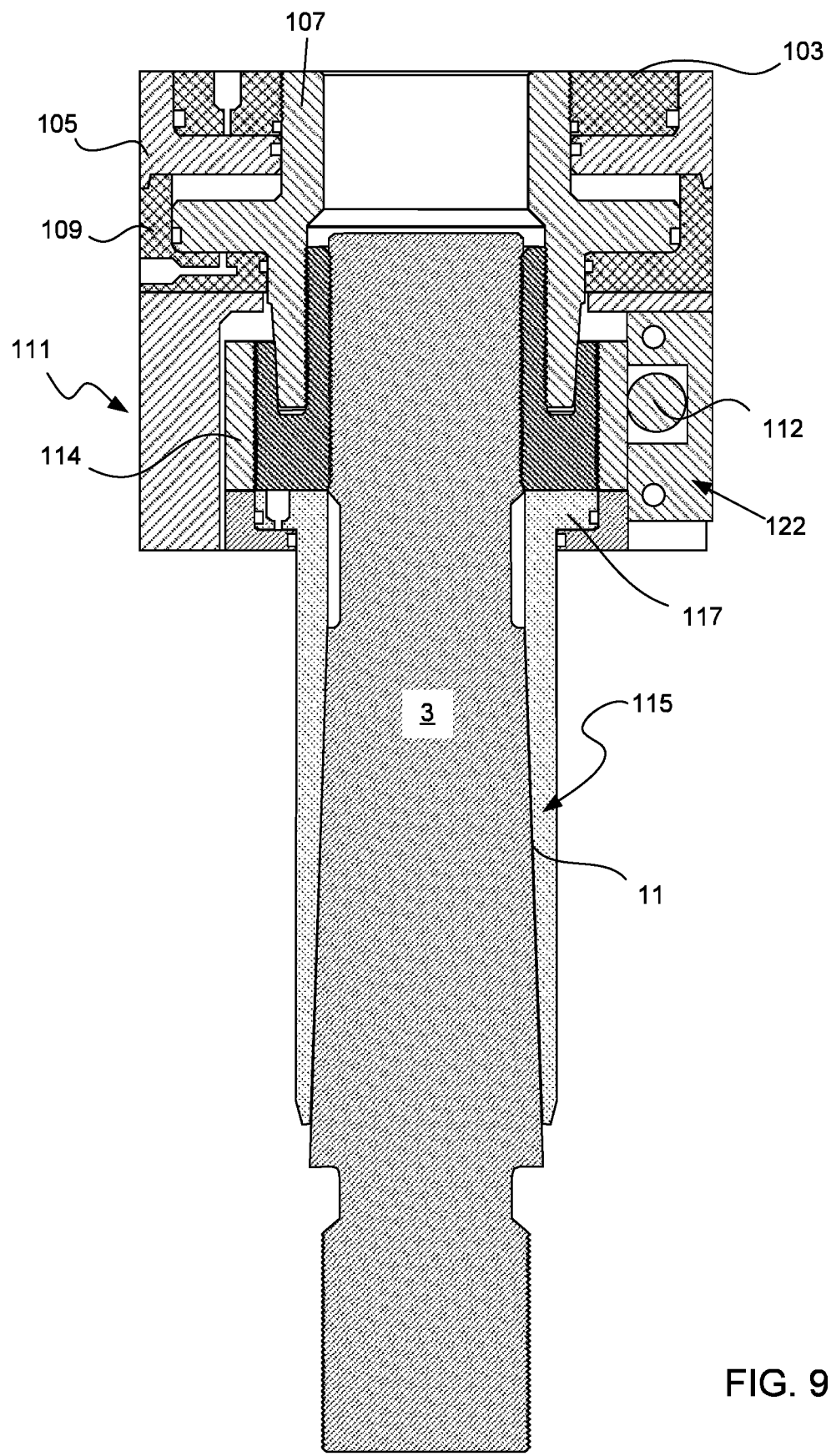
FIG. 9 is a longitudinal cross-sectional view of a hydraulic tensioning and release tool according to a second and preferred embodiment of the present invention shown attached to an end of a stud of an expansion fastener to thereby provide an expansion bolt assembly.
Figure 10:
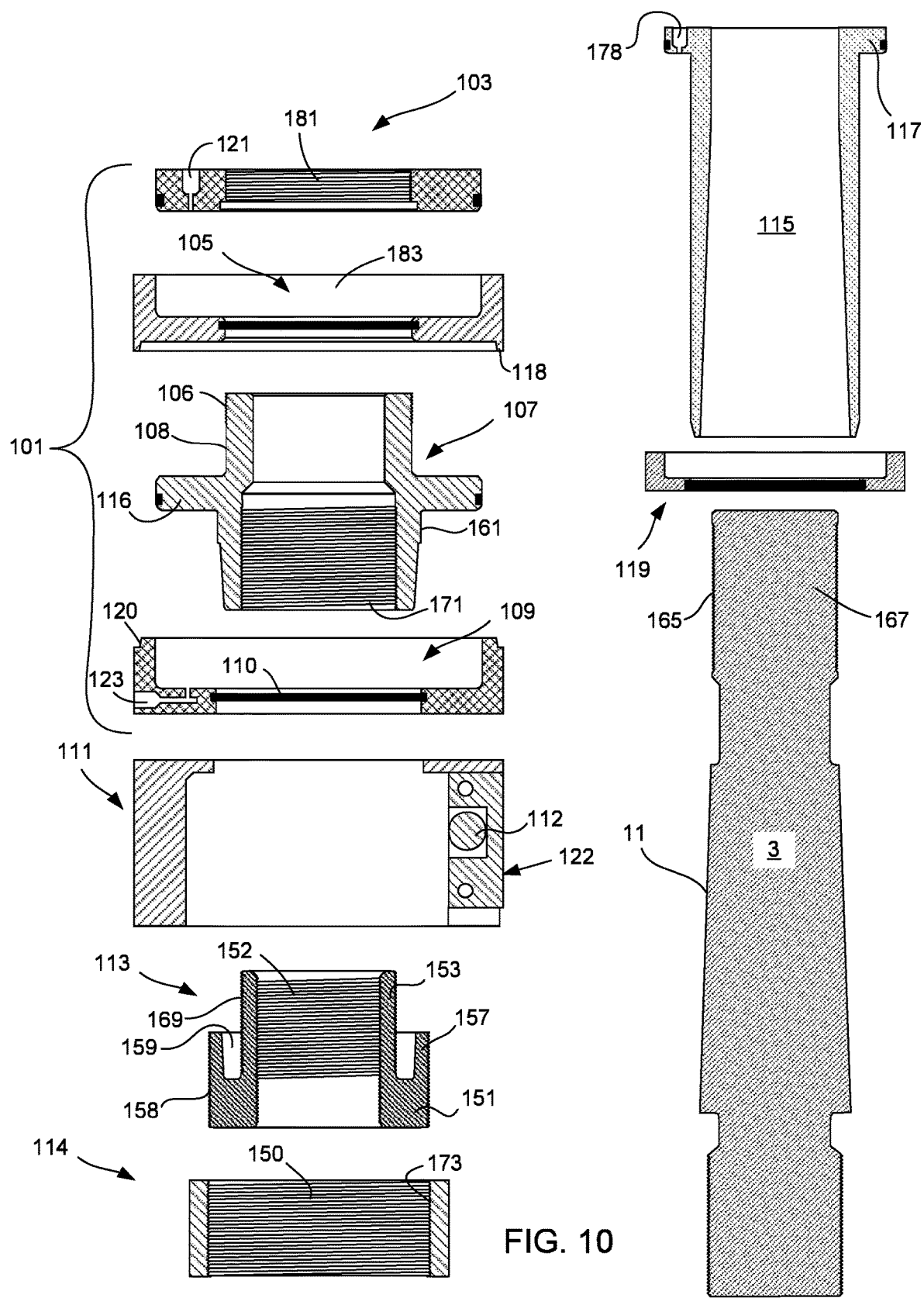
FIG. 10 is an exploded view corresponding to FIG. 9.

FIG. 9 depicts a hydraulic tensioning and release tool 100 whereas FIG. 10 shows the release tool in exploded form. Each of the various components are substantially annular and are illustrated cross-sectioned along a common longitudinal axis. The various components that are illustrated in FIGS. 9 and 10 include a tensioning assembly 101 (which is shown assembled in FIG. 16). Tensioning assembly 101 comprises an annular first tension piston head 103 which includes a threaded inner wall 181 for threaded engagement with an upper threaded outer wall portion 106 of piston rod 107. A hydraulic port 121 is formed vertically through the first piston head 103 for introducing hydraulic fluid into a first tension chamber 125 (FIG. 18) defined between the first tension piston head 103 and first tension cylinder 105. It will be realized that the port could alternatively be formed through a wall of the cylinder.

Tension cylinder 105 includes a central circular opening 183 which locates over lower portion 108 of the upper end of the tension piston rod 107 and seals thereabouts by means of seals, shown in the drawings throughout as entirely black squares and rectangles.

The tension piston rod 107 includes a second tension piston head 116, which is integrally formed with annular tension piston rod 107 and which extends radially thereabout. A second tension cylinder 109 includes a central circular opening 110 which locates sealingly around the outside of the lower portion 161 of the tension piston rod 107. The second tension cylinder 109 is formed with a radially extending hydraulic port 123 for introducing hydraulic fluid into a second tension chamber 127 (FIG. 18) defined between the second tension piston head 116 and the second tension cylinder 109.

The second tension cylinder 109 is supported upon an annular bridge assembly 111, which includes a locking ring worm drive 112 that meshes with teeth 126 (visible in FIG. 15B) of an outer wall of locking ring 114. The bridge 111 acts to transmit compressive force from the first and second tension cylinders 103, 109 to a workpiece, for example flange 33.

A nut 113 is provided that includes an annular base 151 from which axially extend inner and outer coaxial walls 153 and 157 defining a coaxial void 159 therebetween for receiving the lower end 161 of the annular tension piston rod 107. An inner side of the inner cylinder 153 bears a thread 152 for engaging a corresponding thread 165 of the upper end 167 of the elongate member 3. An outer side 169 of the inner cylinder 153 is threaded for engaging a correspondingly threaded portion of an inner wall 171 of the annular tension piston 107.

An outer side of the outer cylinder 157 bears a thread 158 for engaging a corresponding thread 150 of an inner side 173 of locking ring 114. An expansion sleeve 115 (for example having a longitudinally extending longitudinal split, as described previously) is provided which surrounds the tapered portion 11 of the stud 3 and which includes an integral release piston 117. The release piston 117 seats in an annular release cylinder 119 that locates beneath the locking ring 114 and which encircles the sleeve 115 and stud 3. The stud 3 comprises an elongate member that has a tapered portion 11 for imparting radial force to the sleeve 115 when tensioned.

Figure 11:
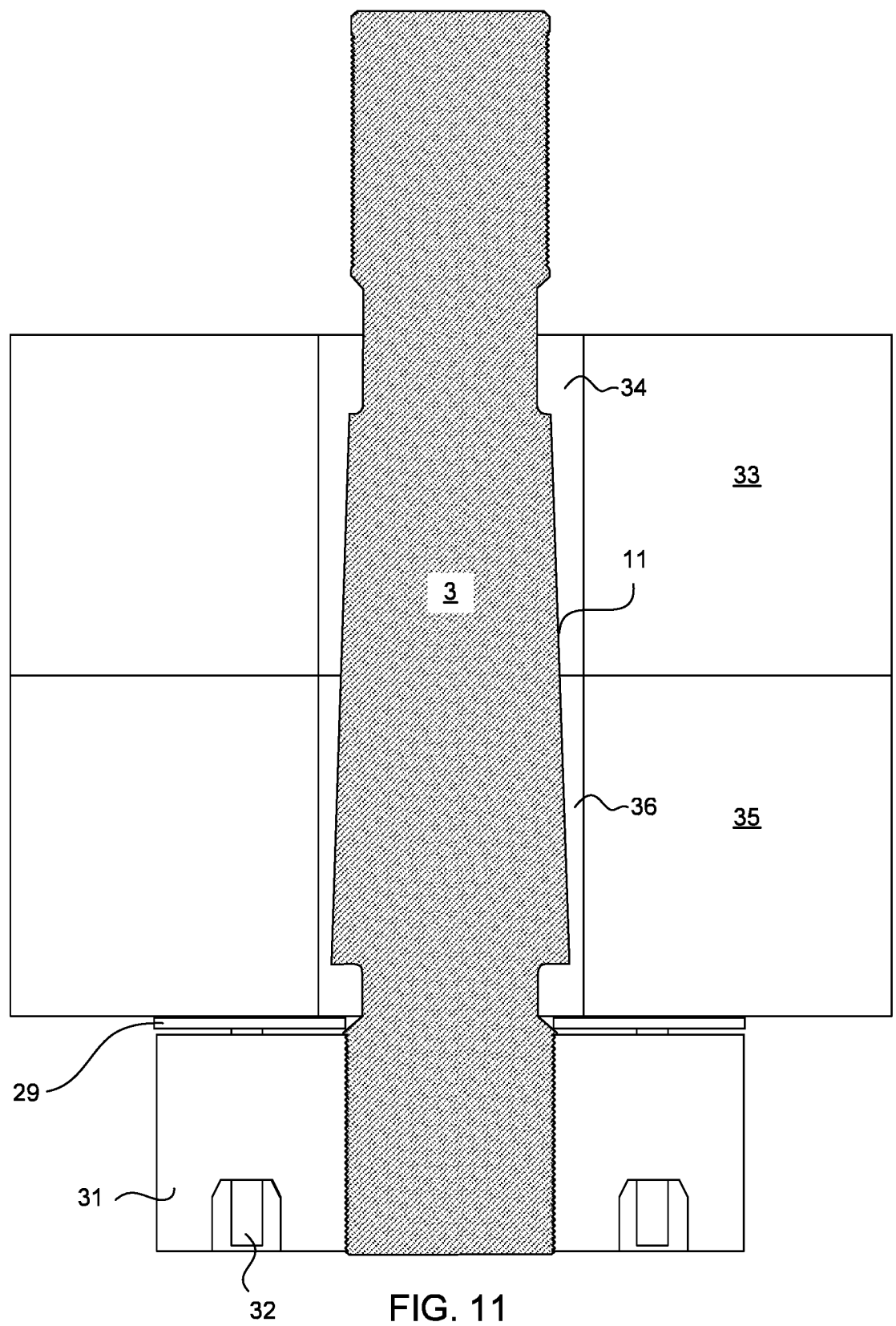
FIGS. 11 to 15 illustrate a first series of stages in the installation of the tool of FIG. 9 to a workpiece comprising a pair of opposed flanges.

Referring now to FIG. 11, initially the stud 3 is inserted through corresponding bores 34, 36 of a workpiece in the form of flanges 33 and 35 that are to be fastened together. A first capture arrangement in the form of an MJT 31 with washer 29 and jackbolts 32 is threaded to the lower end (as shown in FIG. 11 onwards) of the stud 3 to thereby capture the lower end (as shown in FIGS. 12-22) of the stud 3.

Figure 12:
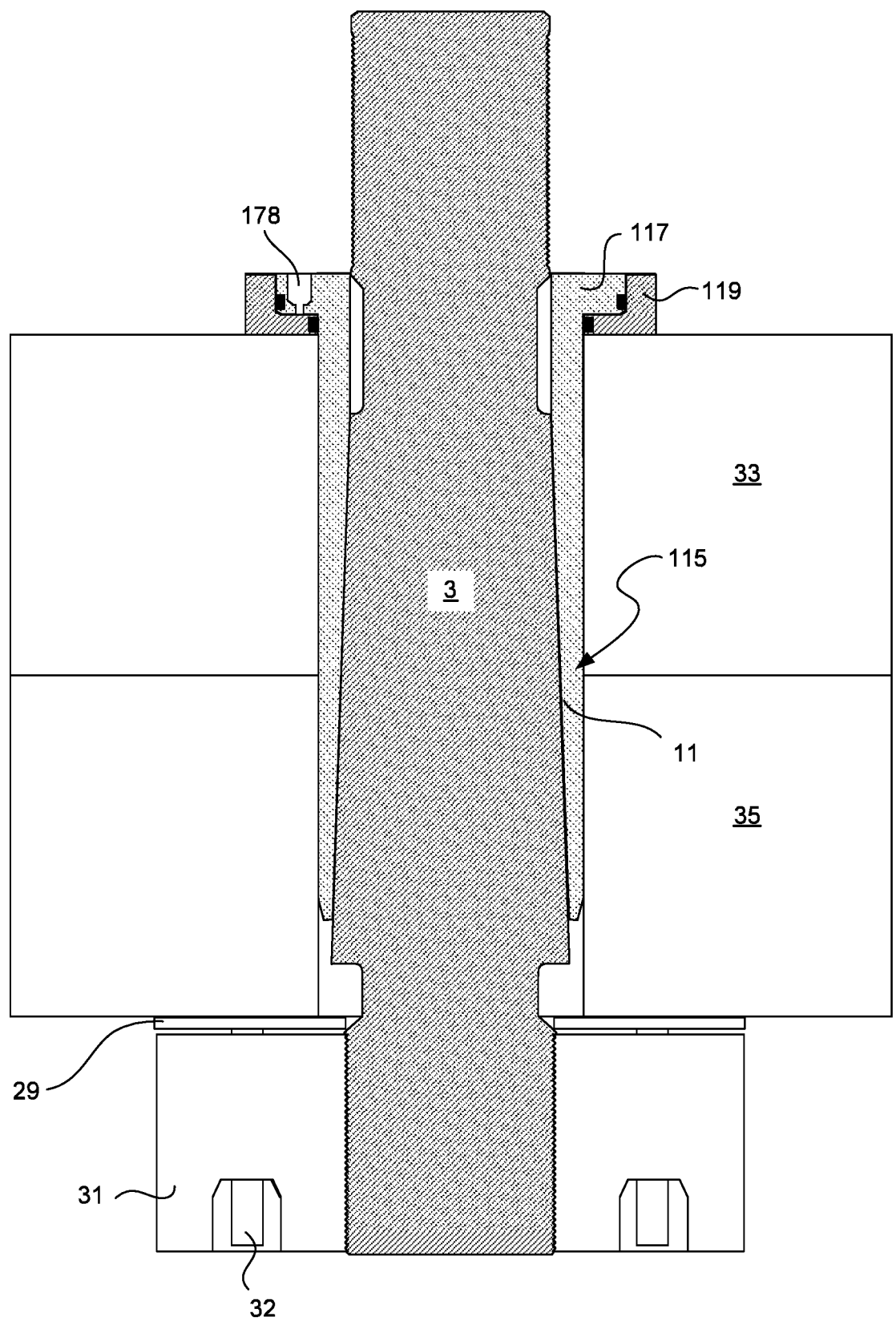

The release cylinder 119 is located over the upper end of stud 3 and brought down against the outer side of flange 33 as shown in FIG. 12. Expansion sleeve 115 is fitted over the top of the stud 3 and slid down so that it inserts between the stud and the release cylinder 119 and thence the walls of the bores of the flanges 33 and 35 until release piston 117 locates within release cylinder 119 as shown.

Figure 13:
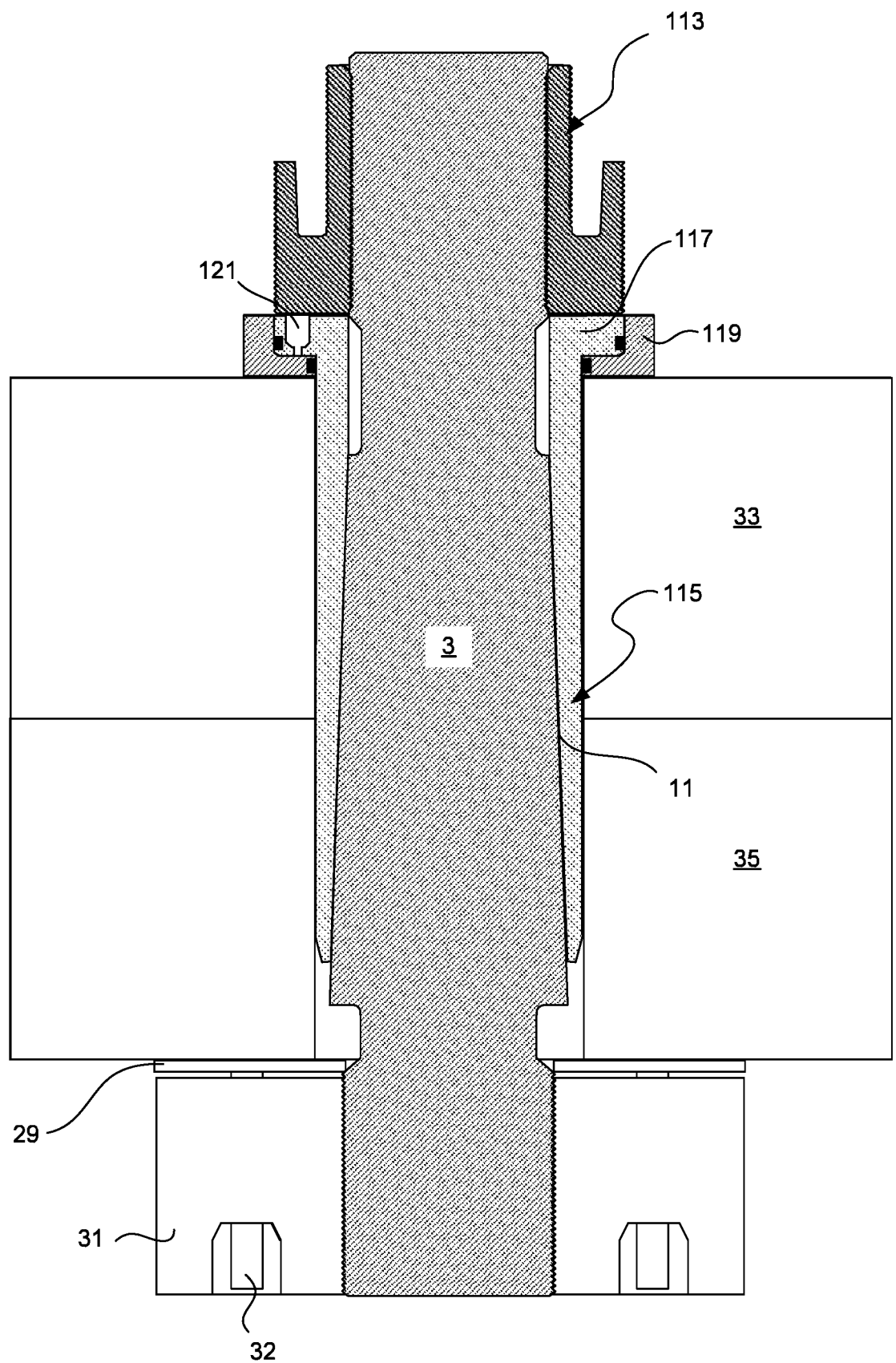

Referring now to FIG. 13, a second capture arrangement in the form of nut 113 is then threaded on to the upper end of stud 3 and turned down to abut the upper side of the release piston 117 of sleeve 115.

Figure 14:
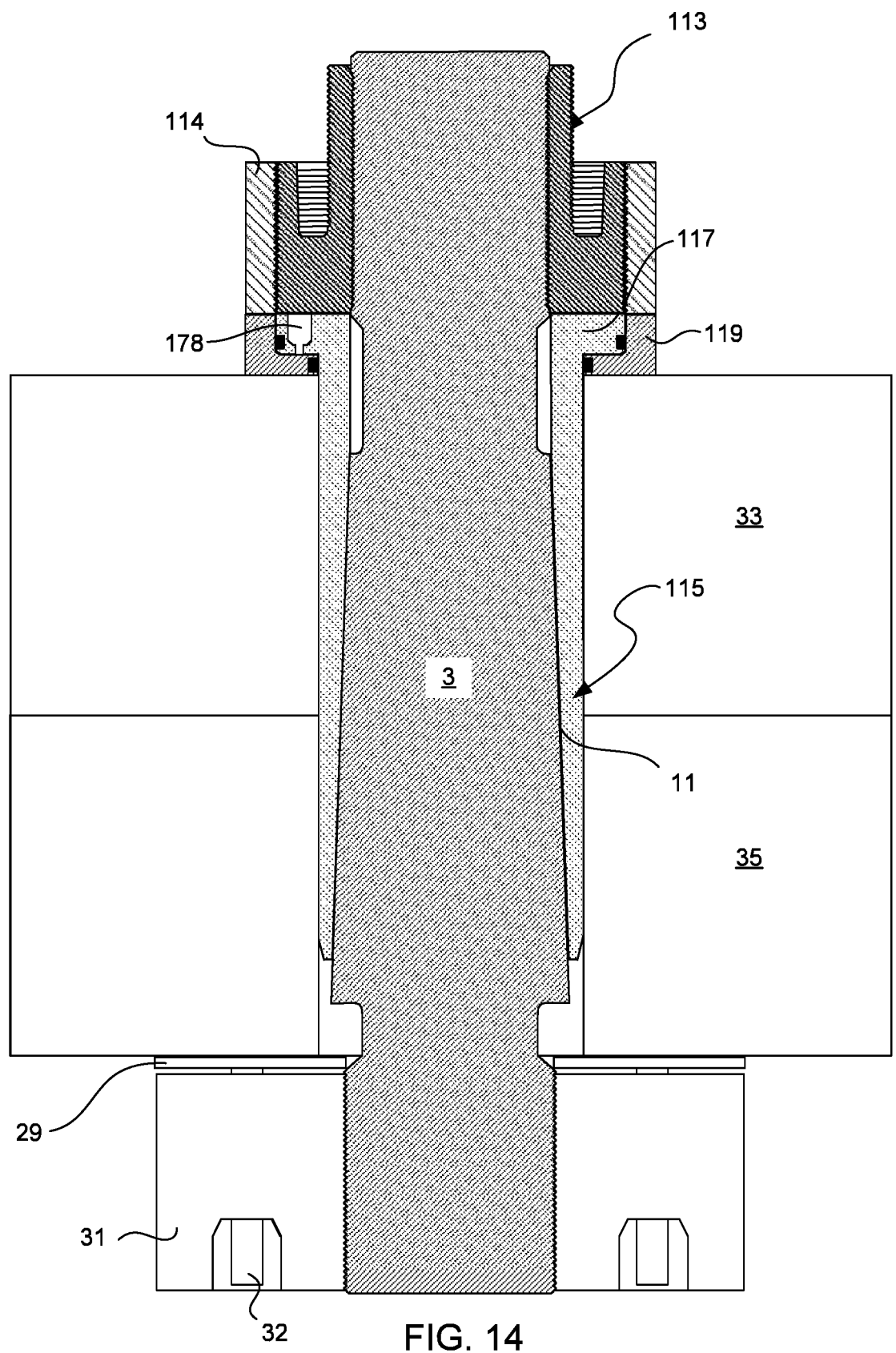

Locking ring 114 is then threaded over the outside of nut 113 and turned down to abut the upper end of release piston 119 as shown in FIG. 14.

Figure 15:
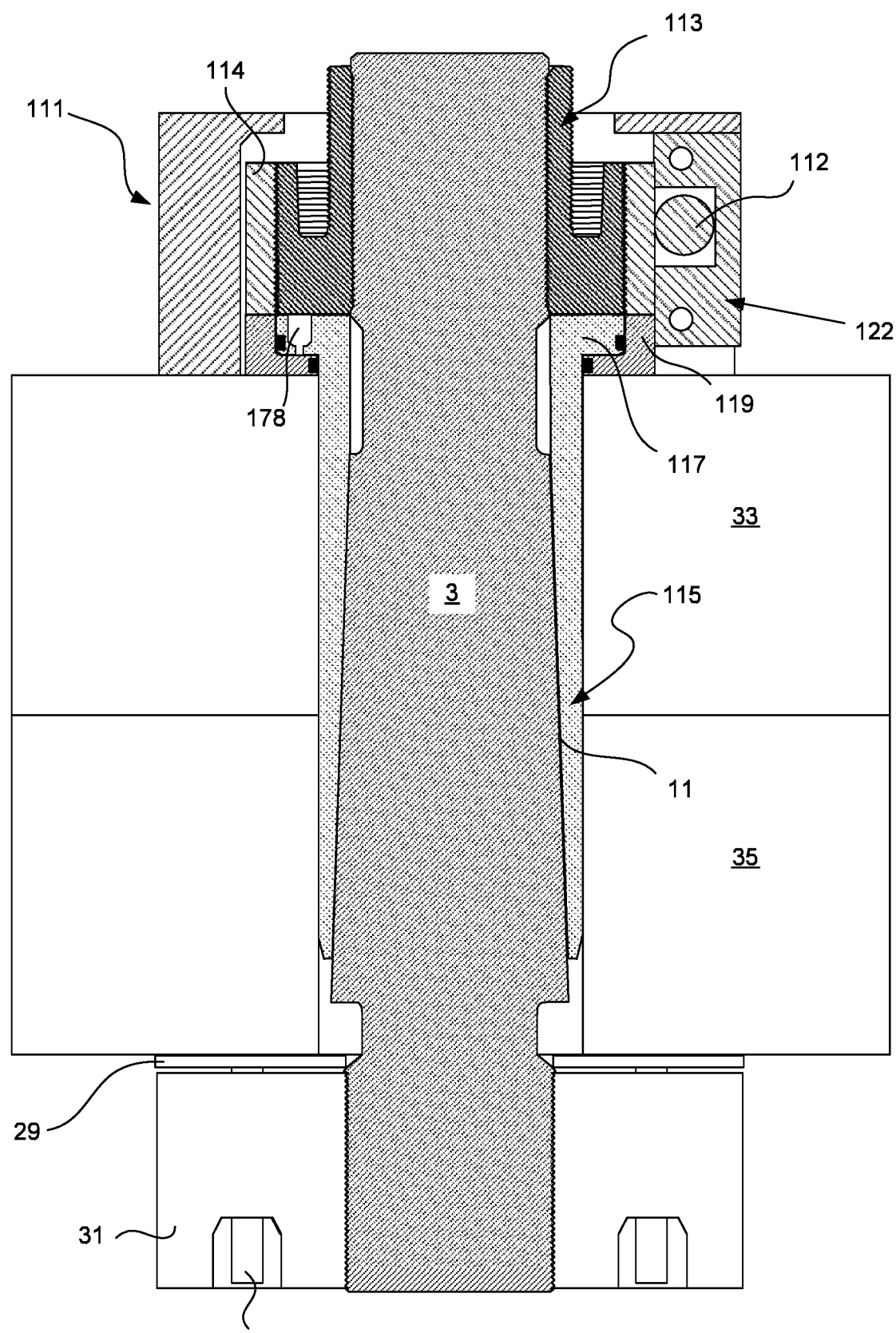
Figure 15A:
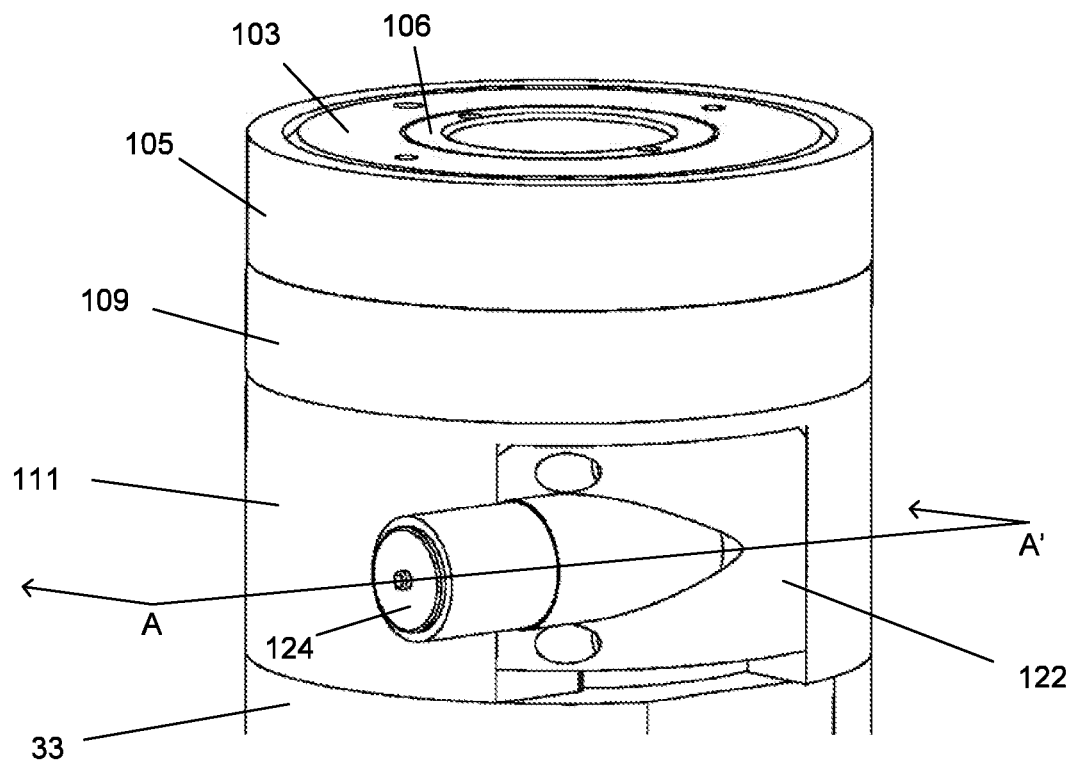
FIG. 15A is a view of the side of the installation tool showing an external view of a locking ring drive assembly.
Figure 15B:
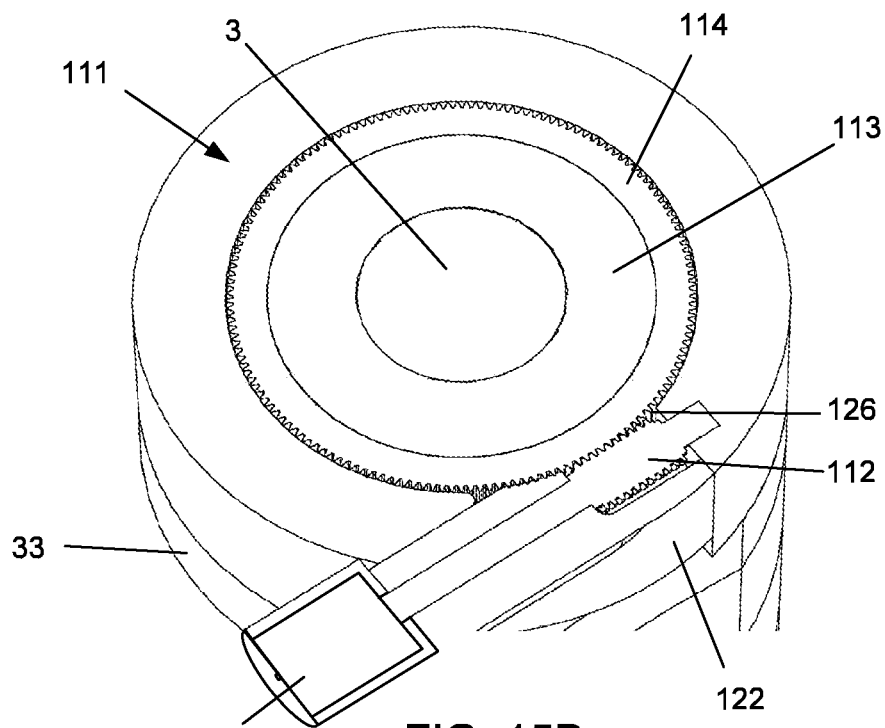
FIG. 15B is a cross sectional view of the installation tool through the line A-A' of FIG. 15A.

The bridge assembly 111 is then located over the locking ring 114 and release cylinder 119 as shown in FIG. 15. As best seen in FIGS. 15A and 15B, the bridge assembly 111 includes a drive assembly 122 that includes a worm drive 112 that meshes with teeth 126 formed on the outside of the locking ring 114. Worm drive 112 is driven by an electric motor 124 (or other rotary power arrangement) that can be activated from a remote position so that personnel can remain at a safe distance from the tensioning tool when hydraulic pressure is applied to tension the stud in a manner that will be explained.

Figure 16:
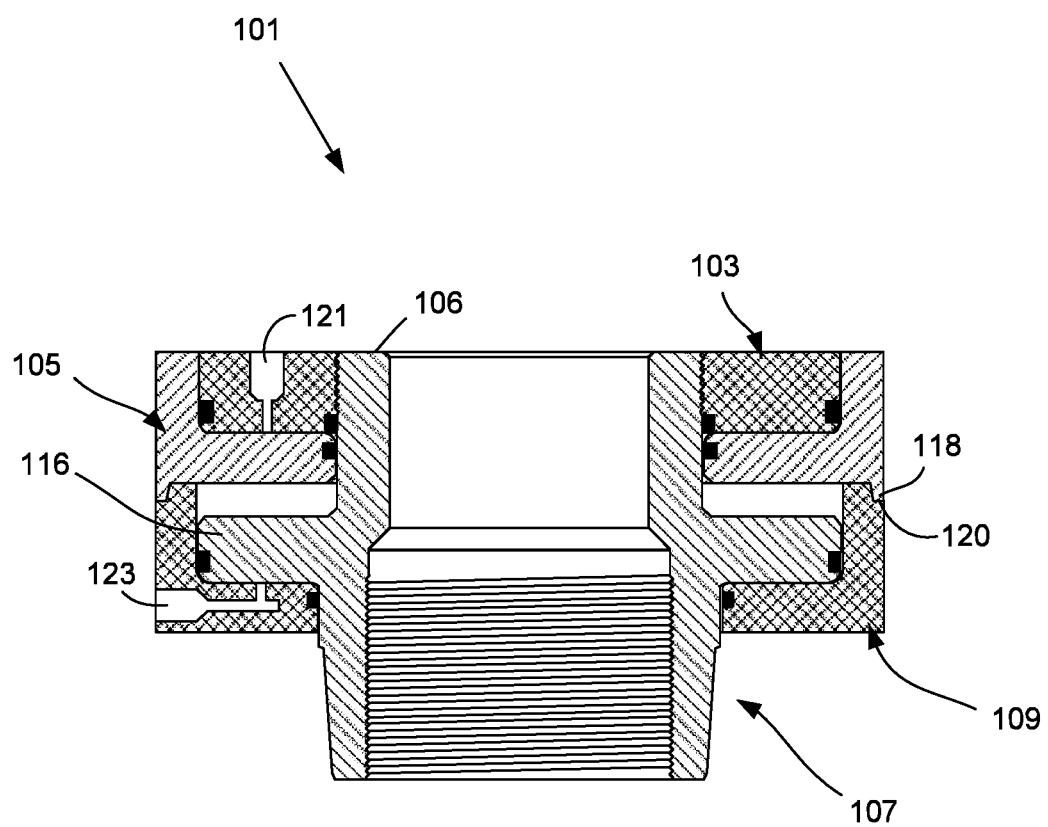
FIG. 16 is a cross sectional view of a tensioning assembly of the tool of FIG. 9.

Tensioning assembly 101 is arranged as shown in FIG. 16 with the central hole 183 (FIG. 10) of the upper first tensioning cylinder 105 located about portion 108 (FIG. 10) of the tension piston rod 107 and with the first tension piston 103 threaded about the externally threaded upper portion 106 of the tension piston rod 107 and seated in the first tensioning cylinder 105. The lower end 161 (FIG. 10) of the tension piston rod 107 inserts through central opening 110 of the second tensioning cylinder 109 with second piston head 116 being received in the cylinder 109. Corresponding peripheral protrusion 118 and recess 120 are respectively formed on the underside of the first tension cylinder 105 and upper side of the second tension cylinder 109 to assist in alignment therebetween.

Figure 17:
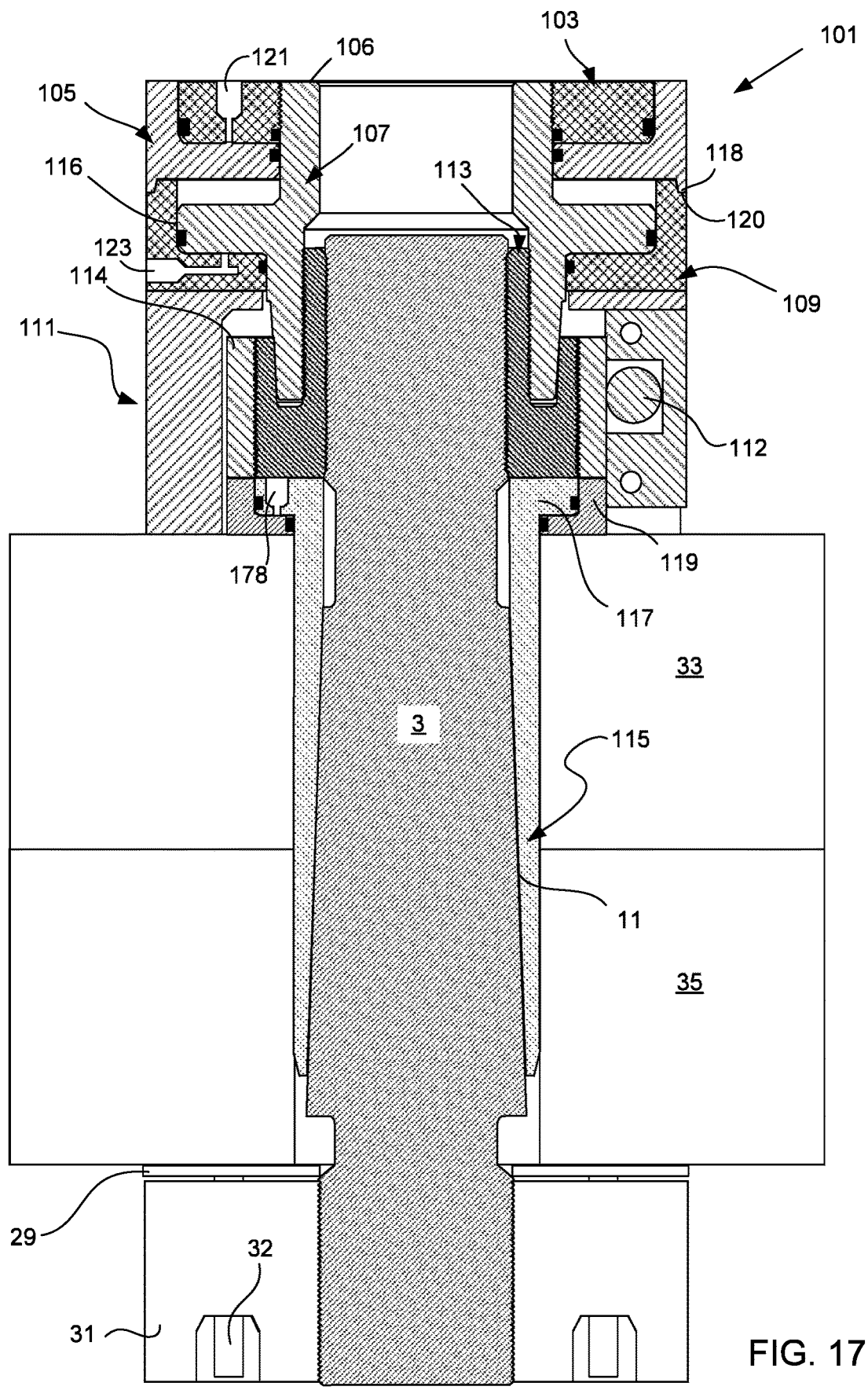
FIG. 17 shows a final stage in the installation of the tool of FIG. 9.

The tensioning assembly 101 is then coupled to the nut 113 and thus via nut 113 to the upper end of stud 3 by threading the lower inside wall 171 (FIG. 10) of the tension piston rod 107 over the upper outside wall 169 of the nut 113 to arrive at the configuration that is illustrated in FIG. 17.

Figure 18:
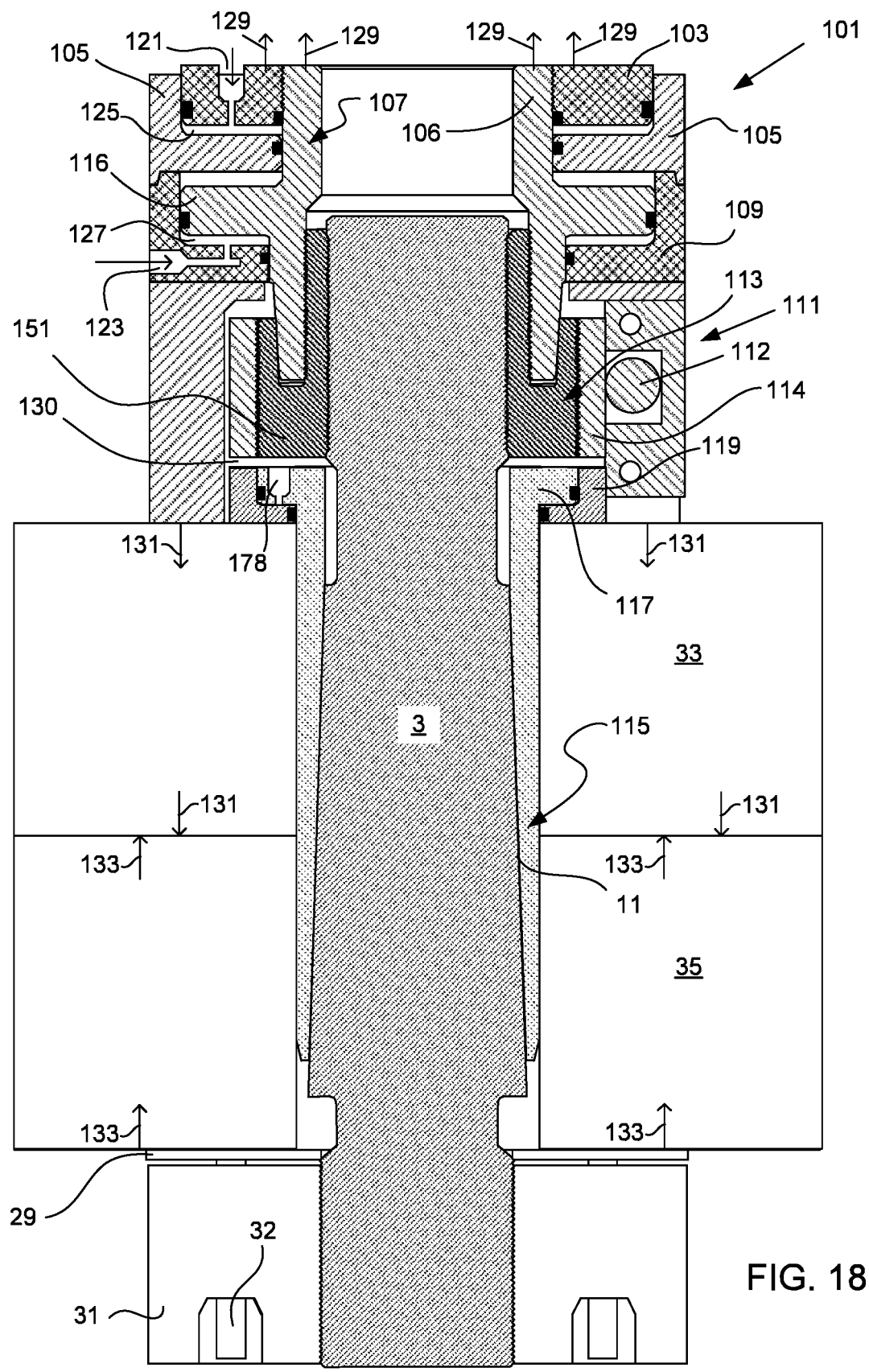
FIG. 18 shows the tool of FIG. 9 with tensioning hydraulic pressure applied to stretch a stud.

Referring now to FIG. 18, hydraulic fluid pressure is then applied to first and second ports 121 and 123 of the first tension piston 103 and the second tension piston 109 so that hydraulic pressure is introduced into first piston tension chamber 125 and second piston chamber 127. The hydraulic pressure forces the piston heads 103, 116 upwards and at the same time the tension cylinders 105, 109 downwards. Consequently, the tension cylinders exert compressive force 131 against the workpiece, i.e. flanges 33 and 35 via the bridge 111 which is balanced by corresponding compressive forces 133 arising from the MJT 31 at the opposite end of the stud 3 so that the flanges 33 and 35, which comprise the workpiece in the present example of use, are compressed tightly together. Simultaneously the piston rod 107 and so nut 113 and upper end 167 (FIG. 10) of stud 3 are urged upward as indicated by arrows 129 thereby stretching and tensioning the stud 3. Consequently, a gap 130 appears between the upper sides of the release cylinder 119 and of the release piston 117 of the expansion sleeve 115 and the underside of the nut 113 and locking ring 114. While the gap 130 is maintained the locking ring 114 is turned, by remote operation of worm drive 112, to rotate it down the nut 113 so that the lower end of locking ring 114 comes down to abut the upper side of the release cylinder 119 as shown in FIG. 19 thereby retaining tension in the stud 3 once the hydraulic pressure is removed from ports 121 and 123.

Figure 20:
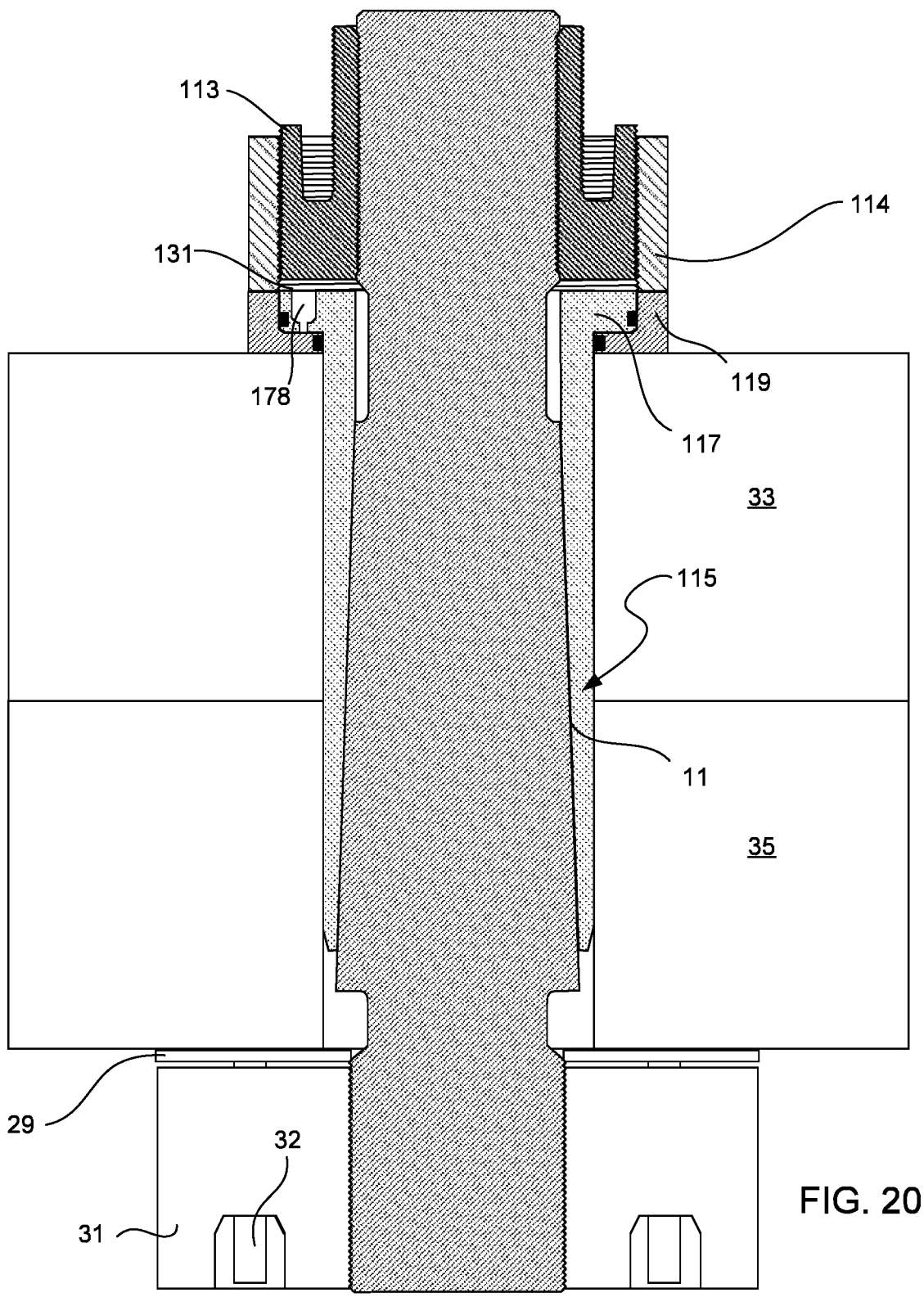
FIG. 20 shows the tool of FIG. 9 in a final tensioned state.

The tensioning assembly 101 and bridge 111 can then be removed so that the stud 3 remains in tension due to the locking ring 114 as shown in FIG. 20.

Figure 19:
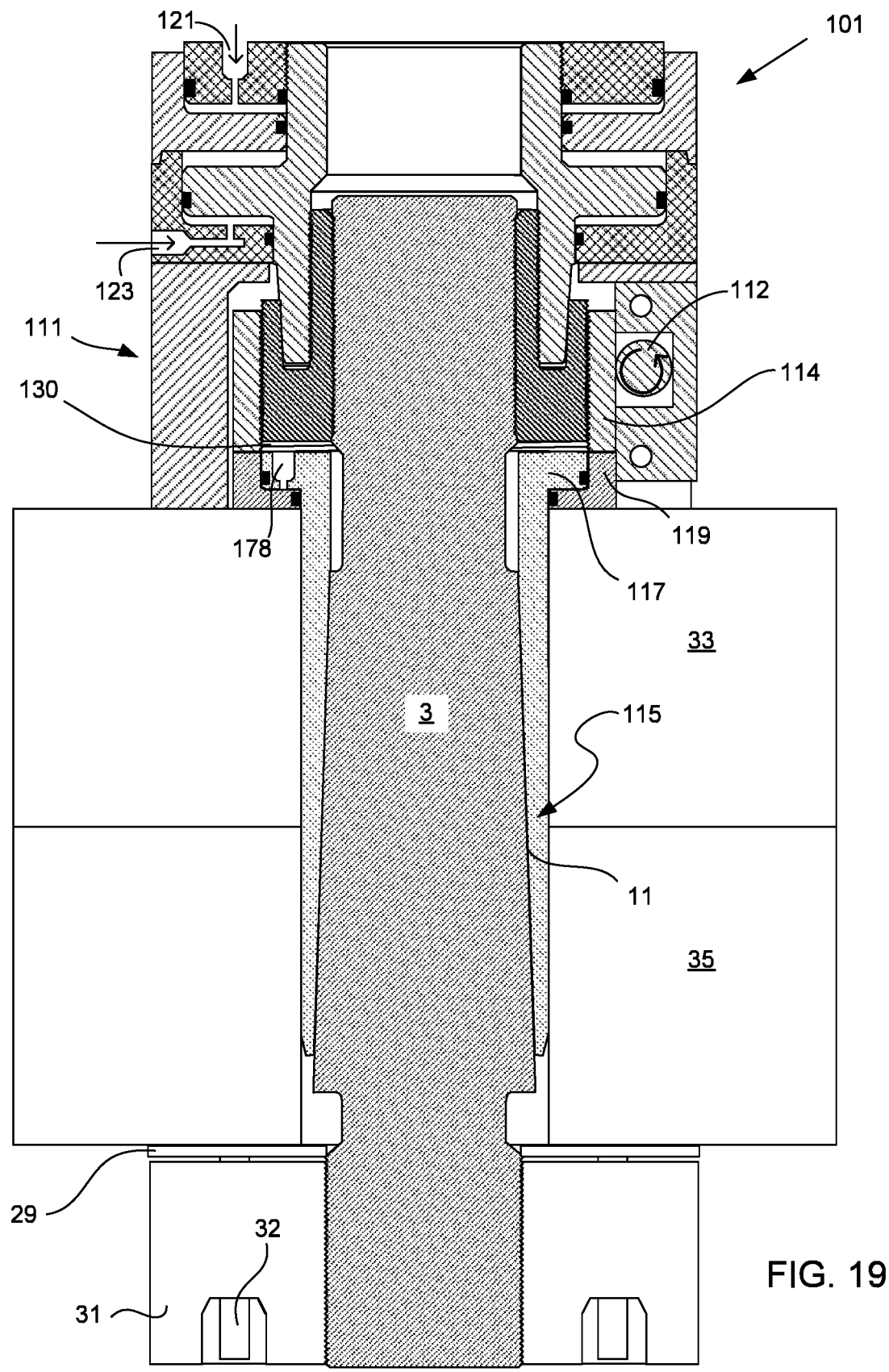
FIG. 19 shows the tool of FIG. 9 with a locking ring of the tool rotated down to maintain the stud in a tensioned state.

If it is subsequently desired to remove the stud 3 then the bridge assembly 111 and tensioning assembly are put back in place as shown in FIG. 19. Hydraulic pressure is applied through ports 121 and 123 to stretch the stud a little further so that the locking ring 114 is backed off. The locking ring 114 can then be rotated up the nut 113 and the hydraulic pressure then removed from ports 121 and 123 so that the stud is removed from being in tension. The tensioning assembly 101 the bridge assembly 111, nut 113 and locking ring 114 can then be removed.

Figure 21:
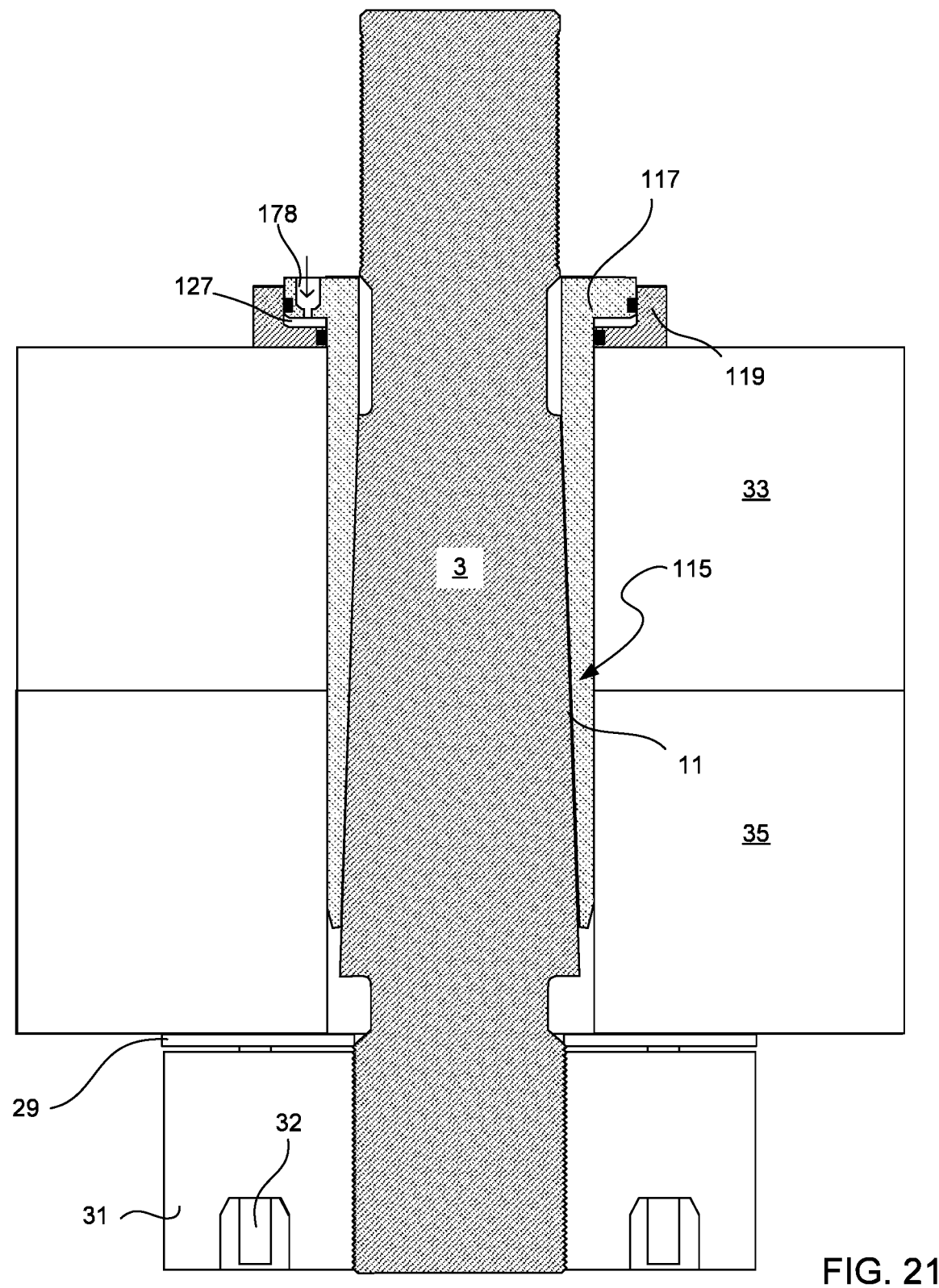
FIG. 21 illustrates the application of hydraulic pressure to a release chamber of the tool of FIG. 9 to release a sleeve of from the stud.
Figure 22:
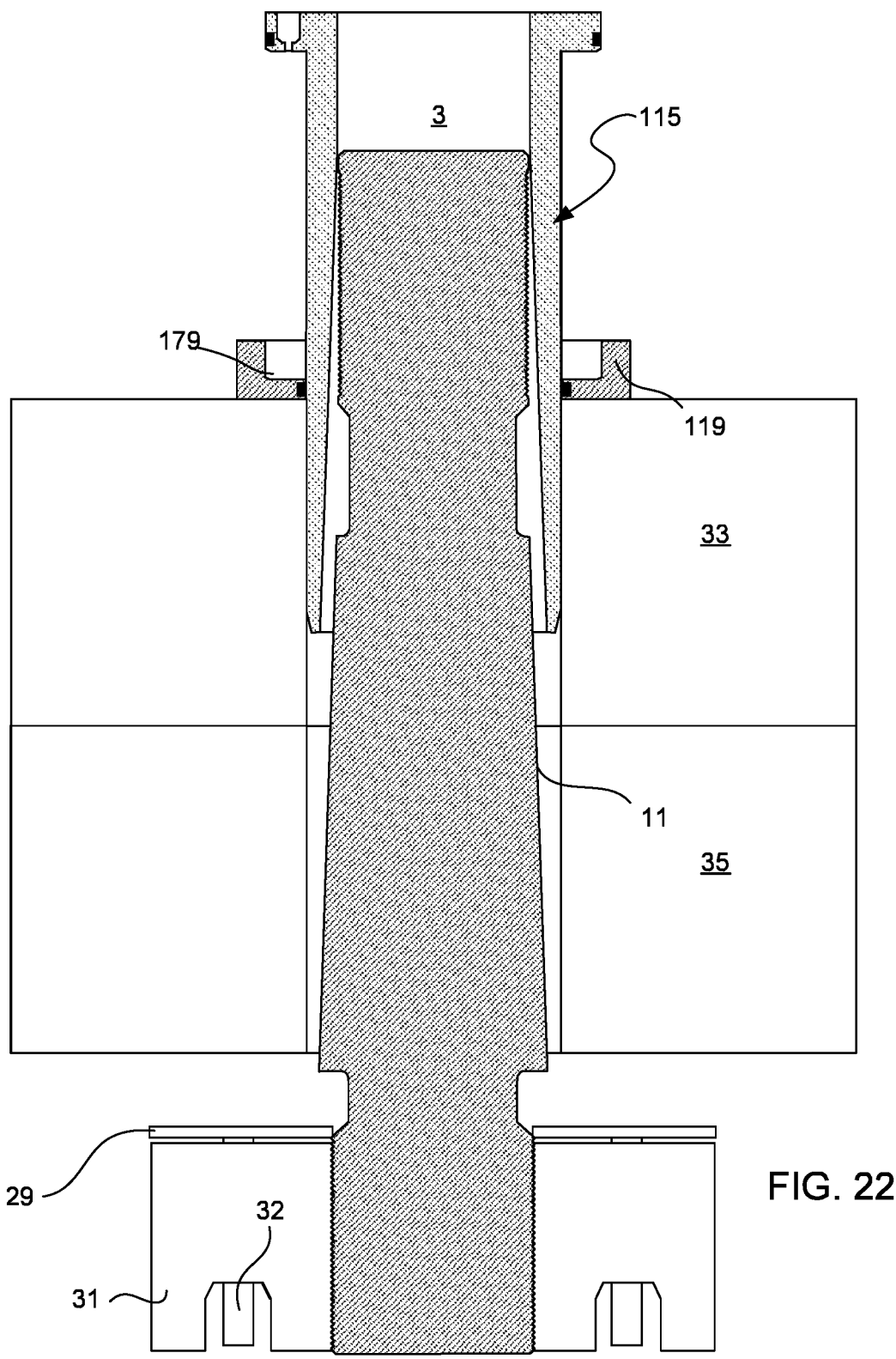
FIG. 22 illustrates the removal of the stud and sleeve from the bores of the flanges.

With reference to FIG. 21, in order to release the expansion sleeve 115 from the tapered portion 11 of the stud 3, hydraulic pressure is then applied to a release port 178 of release piston 117 so that a release chamber 179 increases in volume and displaces piston 117 and thus forces the sleeve 115 away from the stud 3, and so also away from the workpiece being flange 33, so that sleeve 115 can then be manually removed, as shown in FIG. 22, after subsequent disconnection of the hydraulic pressure to the port 178.

Figure 23:
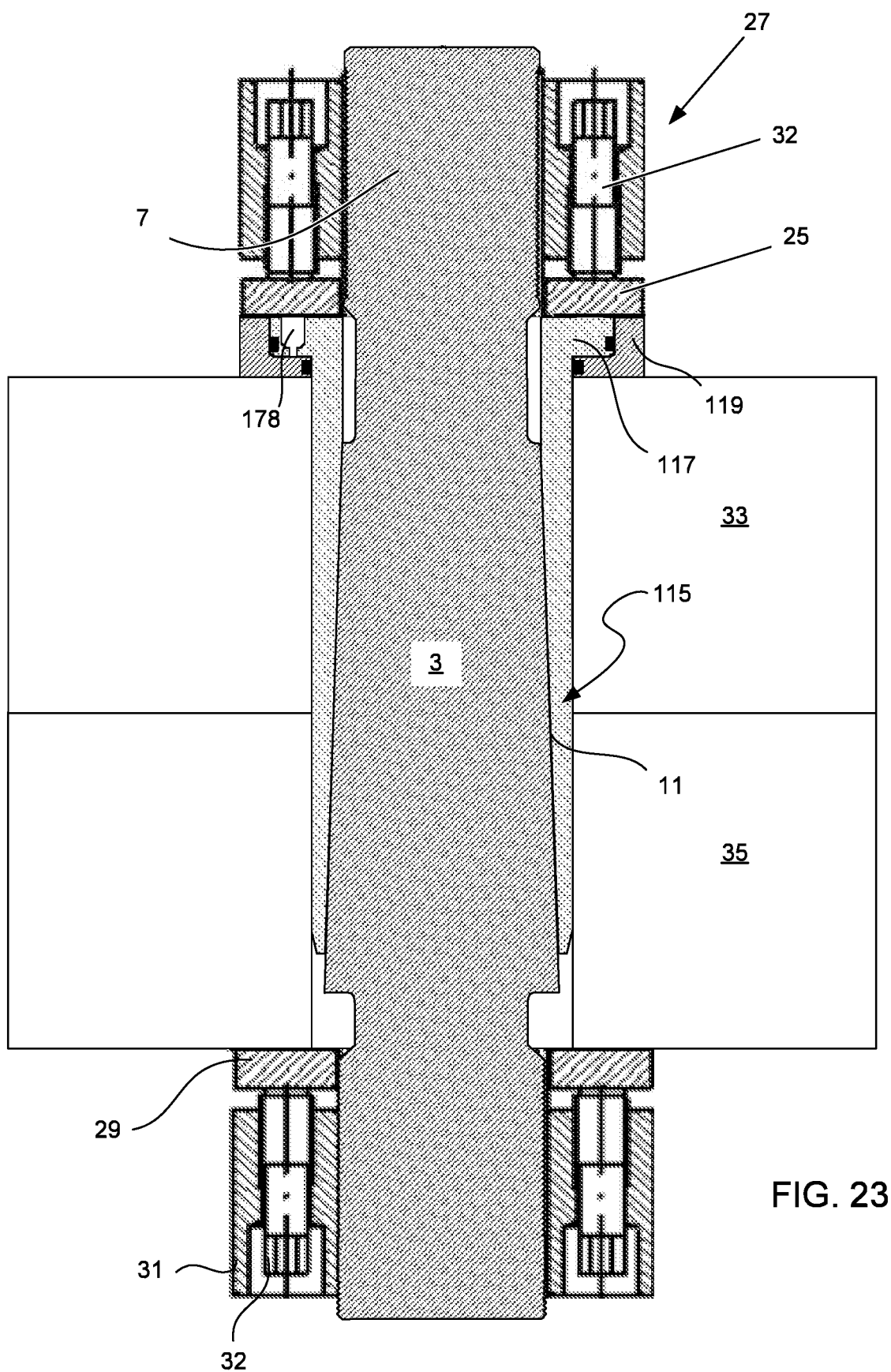
FIG. 23 depicts an embodiment that incorporates a hydraulically displaceable sleeve in which opposed ends of the elongate fastener are captured and tensioned by non-hydraulic tensioners, which in the depicted example comprised opposed MJTs.

FIG. 23 depicts an embodiment that incorporates a hydraulically displaceable sleeve 114, integrally formed with a piston 117 that seats in a cylinder 119. Opposed ends of the elongate fastener are captured and tensioned by non-hydraulic tensioners, which in the depicted example comprise opposed MJTs 27 and 31. Washer 25 of MJT 27 is placed atop cylinder 119 and piston 117 and jackbolts 32 are then tensioned to stretch stud 3 and expand sleeve 115 as previously described. When it is desired to disassemble the fastener the jackbolts 32 are untorqued so that the MJT 27 can be removed from stud 3. Hydraulic pressure can then be applied to port 178 to displace the sleeve away from tapered portion 11 of the stud 3 and from the workpiece, which in the present example comprises flange 33.

Consequently, the second and preferred embodiment includes some additional advantages over the first embodiment of the invention. A major advantage is that the tensioning hydraulics are all incorporated into the tensioning assembly 101 which can be entirely removed once the stud has been tensioned and the locking ring has been brought down to maintain the stud in the tensioned state. Similarly the bridge can also be removed so that the only the nut, locking ring, stud, sleeve with release piston and release cylinder need be left to maintain tension in the stud.

Any documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions.

This application including the appended claims is therefore intended to cover all such changes and modifications that are within the scope of this application.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A hydraulic tensioning and release tool for an expansion fastener having an elongate member with a tapered portion for fastening a workpiece, the hydraulic tensioning and release tool comprising:
   a sleeve for placement about the tapered portion;
   a cylinder for generating compressive force against the workpiece;
   a tension chamber defined at least in part by the cylinder and a tension piston, the tension piston being arranged for coupling to an end of the elongate member;
   a release chamber defined at least in part by the cylinder and a release piston, the release piston being arranged for displacing the sleeve;
   hydraulic ports in fluid communication with said tension chamber and said release chamber for application of hydraulic pressure thereto to displace the tension piston and the release piston for respectively tensioning the elongate member and for releasing the sleeve from the tapered portion; and
   a tension retaining arrangement for retaining the end of the elongate member in tension subsequent to removal of hydraulic pressure from the tensioning chamber.

2. The hydraulic tensioning and release tool of claim 1, wherein the tension piston includes a passage for an end of said elongate member.

3. The hydraulic tensioning and release tool of claim 2, wherein the tension piston is configured to be threaded onto the end of the elongate member.

4. The hydraulic tensioning and release tool of claim 2, wherein the tension piston is configured to be coupled to the end of the elongate member via an intermediate member, the intermediate member comprising a nut that is threaded on the end of the elongate member, wherein the piston is threadedly fastened to the nut.

5. The hydraulic tensioning and release tool of claim 4, wherein the nut includes inner and outer coaxial walls defining a coaxial trough therebetween for receiving a lower end of an annular tension piston rod of the tension piston,
   wherein an inner side of the inner wall is threaded for engaging a corresponding thread of the end of the elongate member.

6. The hydraulic tensioning and release tool of claim 5, wherein an outer side of the inner coaxial wall is threaded for engaging a correspondingly threaded portion of an inner wall of the annular tension piston.

7. The hydraulic tensioning and release tool of claim 5, wherein the tension retaining arrangement comprises a locking ring.

8. The hydraulic tensioning and release tool of claim 7, wherein an outer side of the outer wall of the nut is threaded for engaging a corresponding thread of an inner side of the locking ring and
   wherein the tension piston includes a first tension piston head and a second tension piston head and wherein the hydraulic tensioning and release tool further includes a first tension cylinder and a second tension cylinder respectively receiving the first tension piston and the second tension piston head.

9. The hydraulic tensioning and release tool of claim 8, wherein the first and second tension piston heads are axially displaced and in series and wherein the first and second tension piston heads radially extend about the annular tension piston rod.

10. The hydraulic tensioning and release tool of claim 9, wherein the first tension piston head is threadedly engaged with the annular tension piston rod, and
    wherein the second tension piston head is integrally formed with the annular tension piston rod.

11. The hydraulic tensioning and release tool of claim 10, wherein the hydraulic ports include a port through the first tension piston head and a port through the second tension cylinder.

12. The hydraulic tensioning and release tool of claim 11, wherein the release piston includes an annular release piston head located about a first annular release piston rod.

13. The hydraulic tensioning and release tool of claim 12, including a second annular release piston rod for coupling to the sleeve.

14. The hydraulic tensioning and release tool of claim 13, wherein the release piston is integrally formed with the sleeve.

15. The hydraulic tensioning and release tool of claim 7, further comprising a release cylinder for applying compressive force to the workpiece.

16. The hydraulic tensioning and release tool of claim 15, further including a bridge between the workpiece and the release cylinder for conveying the compressive force against workpiece.

17. The hydraulic tensioning and release tool of claim 16, wherein the release cylinder is located within the bridge.

18. The hydraulic tensioning and release tool of claim 16, wherein the bridge includes a worm drive meshed with teeth of an outer side of the locking ring for rotation thereof.

19. The hydraulic tensioning and release tool of claim 1, in combination with an expansion fastener comprising an elongate member with a tapered portion and a sleeve thereabout.

20. The hydraulic tensioning and release tool of claim 1, wherein the tension chamber is formed between the cylinder, the tension piston, and a top side of the piston head of the release piston, and
   wherein the release chamber is formed between the cylinder and an underside of the piston head of the release piston.

21. An expansion bolt assembly comprising:
   an elongate member with a tapered portion and a sleeve thereabout for fastening a workpiece,
   a cylinder for generating compressive force against the workpiece;
   a tension chamber defined at least in part by the cylinder and a tension piston, the tension piston being arranged for coupling to an end of the elongate member;
   a release chamber defined at least in part by the cylinder and a release piston, the release piston being arranged for displacing the sleeve;
   hydraulic ports in fluid communication with said tension chamber and said release chamber for application of hydraulic pressure thereto to displace the tension piston and the release piston for respectively tensioning the elongate member and for releasing the sleeve from the tapered portion; and
   a tension retaining arrangement for retaining the end of the elongate member in tension subsequent to removal of hydraulic pressure from the tensioning chamber.

22. A hydraulic tensioning and release tool for an expansion fastener having an elongate member with a tapered portion for fastening a workpiece, the hydraulic tensioning and release tool comprising:
   a sleeve for placement about the tapered portion;
   a cylinder for generating compressive force against the workpiece;
   a tension piston for coupling to an end of the elongate member, the tension piston and the cylinder defining at least one tension chamber;
   a release piston for displacing the sleeve, the release piston and the cylinder defining at least one release chamber;
   hydraulic ports in fluid communication with said tension chamber and said release chamber for application of hydraulic pressure thereto to displace the tension piston and the release piston for respectively tensioning the elongate member and for releasing the sleeve from the tapered portion; and
   a tension retaining arrangement for retaining the end of the elongate member in tension subsequent to removal of hydraulic pressure from the tensioning chamber.

* * * * *